(12) United States Patent
Akuzawa

(10) Patent No.: US 8,429,550 B2
(45) Date of Patent: Apr. 23, 2013

(54) IMAGE PROCESSING APPARATUS THAT CAN BE REMOTELY CONTROLLED AND CONTROL METHOD THEREFOR

(75) Inventor: Masao Akuzawa, Sagamihara (JP)

(73) Assignee: Canon Kabushiki Kaisha (JP)

( * ) Notice: Subject to any disclaimer, the term of this patent is extended or adjusted under 35 U.S.C. 154(b) by 265 days.

(21) Appl. No.: 12/862,189

(22) Filed: Aug. 24, 2010

(65) Prior Publication Data
US 2011/0055764 A1    Mar. 3, 2011

(30) Foreign Application Priority Data
Aug. 26, 2009  (JP) ................................ 2009-195297

(51) Int. Cl.
G06F 13/00 (2006.01)
G06F 15/00 (2006.01)

(52) U.S. Cl.
USPC .......................................... 715/765; 715/806

(58) Field of Classification Search .......... 715/736–739, 715/845, 734, 763–765, 806, 810
See application file for complete search history.

(56) References Cited

U.S. PATENT DOCUMENTS 8,035,827 B2 * 10/2011 Sakai ........................... 358/1.13
2010/0097644 A1 * 4/2010 Takahashi .................... 358/1.15
2010/0182618 A1 * 7/2010 Akiyama et al. ............... 358/1.9

FOREIGN PATENT DOCUMENTS
JP   2003-224696 A   8/2003

* cited by examiner

Primary Examiner — Cao "Kevin" Nguyen
(74) Attorney, Agent, or Firm — Rossi, Kimms & McDowell LLP

(57) ABSTRACT

An image processing apparatus that enables to distinguish whether an execution of a process in the image processing apparatus needs a user's operation on the image processing apparatus. A storage unit stores setting information for executing a function of the image processing apparatus. An execution unit executes the function according to the setting information. A determination unit determines whether a user's operation to the image processing apparatus is required when the execution unit executes the function according to the setting information. An addition unit adds attribute information, which shows whether to permit to automatically execute the function according to the setting information based on an instruction from the information processing apparatus, to the setting information according to a determination result. A sending unit sends the setting information to which the additional unit has added the attribute information to the information processing apparatus.

7 Claims, 35 Drawing Sheets

FIG.6A

```
<?xml version="1.0"encoding="UTF-8"?.>
<BUTTON>
  <NAME>REGULAR MEETING RECORD</NAME>
</BUTTON>
<APPLICATION ID>001</APPLICATION ID>
<ACTION ID>001</ACTION ID>         ⎯ 605
<GROUP>MFC MY-BUTTON</GROUP>
<TEMPORARY>false</TEMPORARY>
```
610 points to the `<GROUP>` line.

FIG.6B

```
<?xml version="1.0"encoding="UTF-8"?.>
<BUTTON>
  <NAME>REGULAR MEETING RECORD</NAME>
</BUTTON>
<APPLICATION ID>001</APPLICATION ID>
<ACTION ID>001</ACTION ID>         ⎯ 2401
<GROUP>TEMPORARY</GROUP>
<TEMPORARY>false</TEMPORARY>
```
610 points to the `<GROUP>` line.

FIG.7

```xml
<?xml version="1.0" encoding="UTF-8"?>
<ACTION ID>001</ACTION ID>
<SETTING VALUE>
<COLOR SELECTION>AUTO</COLOR SELECTION>
<DENSITY>+1</DENSITY>
<MAGNIFICATION>REAL MAGNIFICATION</MAGNIFICATION>
<SHEET SELECTION>AUTO</SHEET SELECTION>
</SETTING VALUE>
<ACTIVE DEVICES>
<ACTIVE DEVICE>PRINTER</ACTIVE DEVICE>
<ACTIVE DEVICE>SCANNER</ACTIVE DEVICE>
</ACTIVE DEVICES>
<EXECUTION>
<IMMEDIATE REMOTE EXECUTION>false</IMMEDIATE REMOTE EXECUTION>
</EXECUTION>
```

820
810

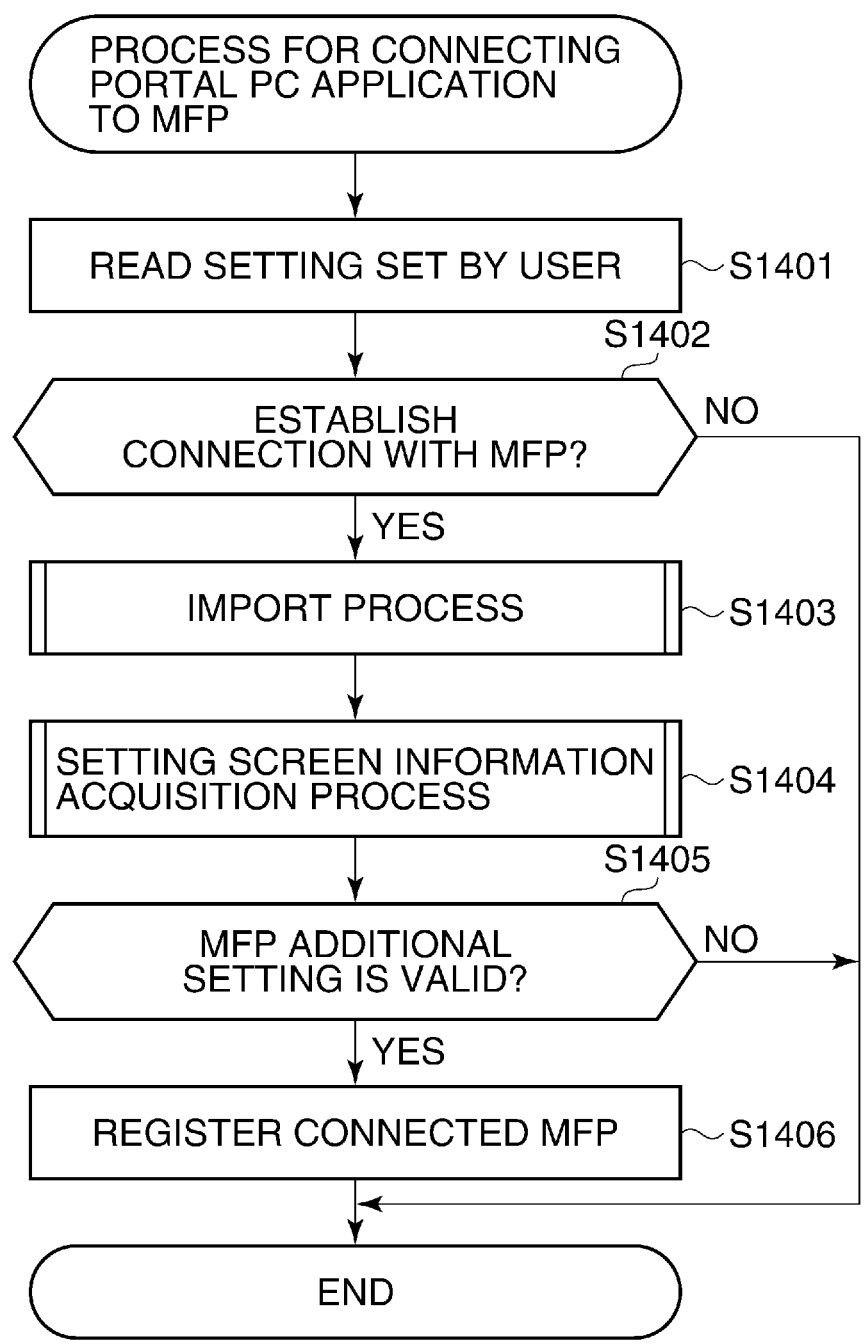

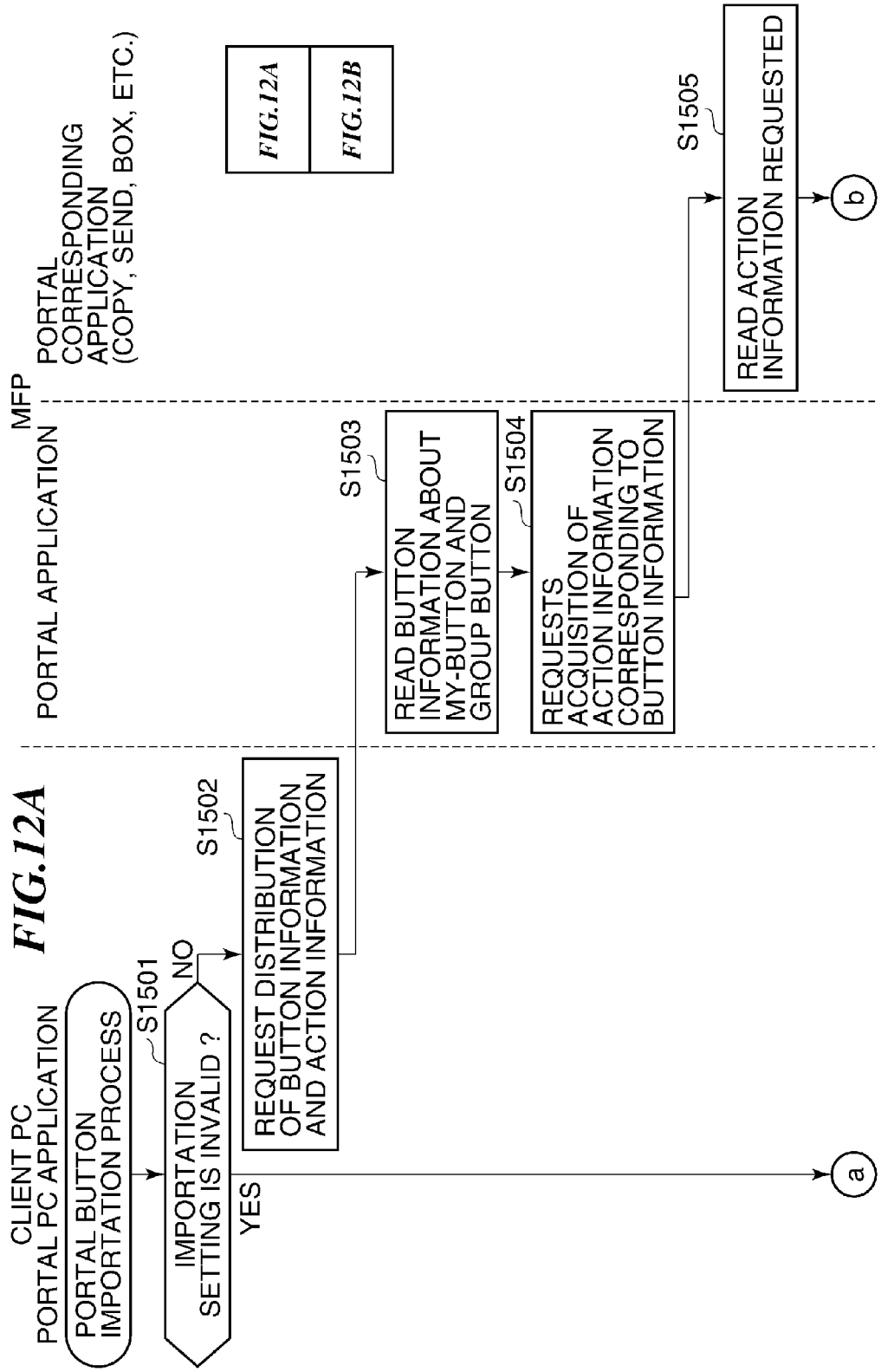

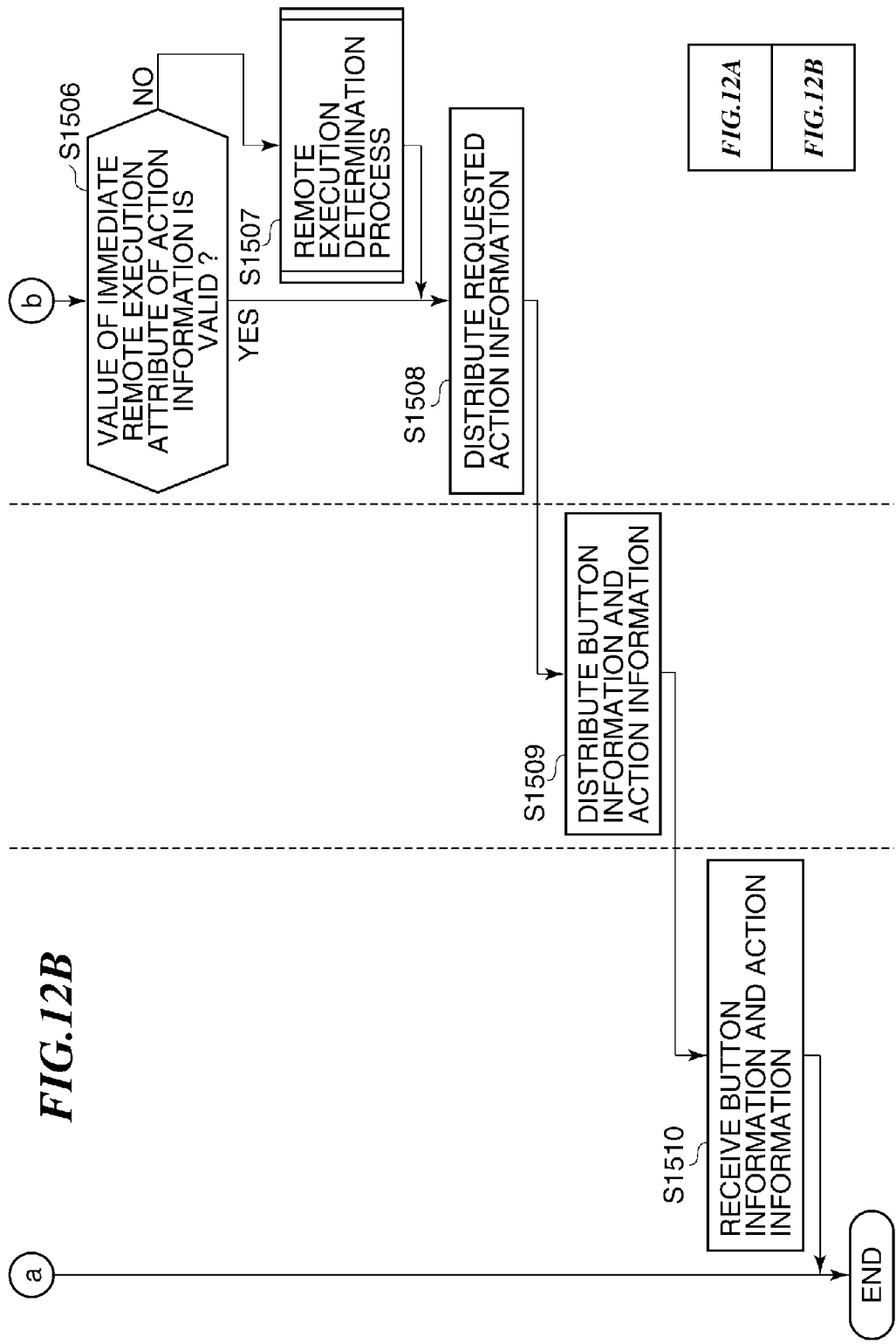

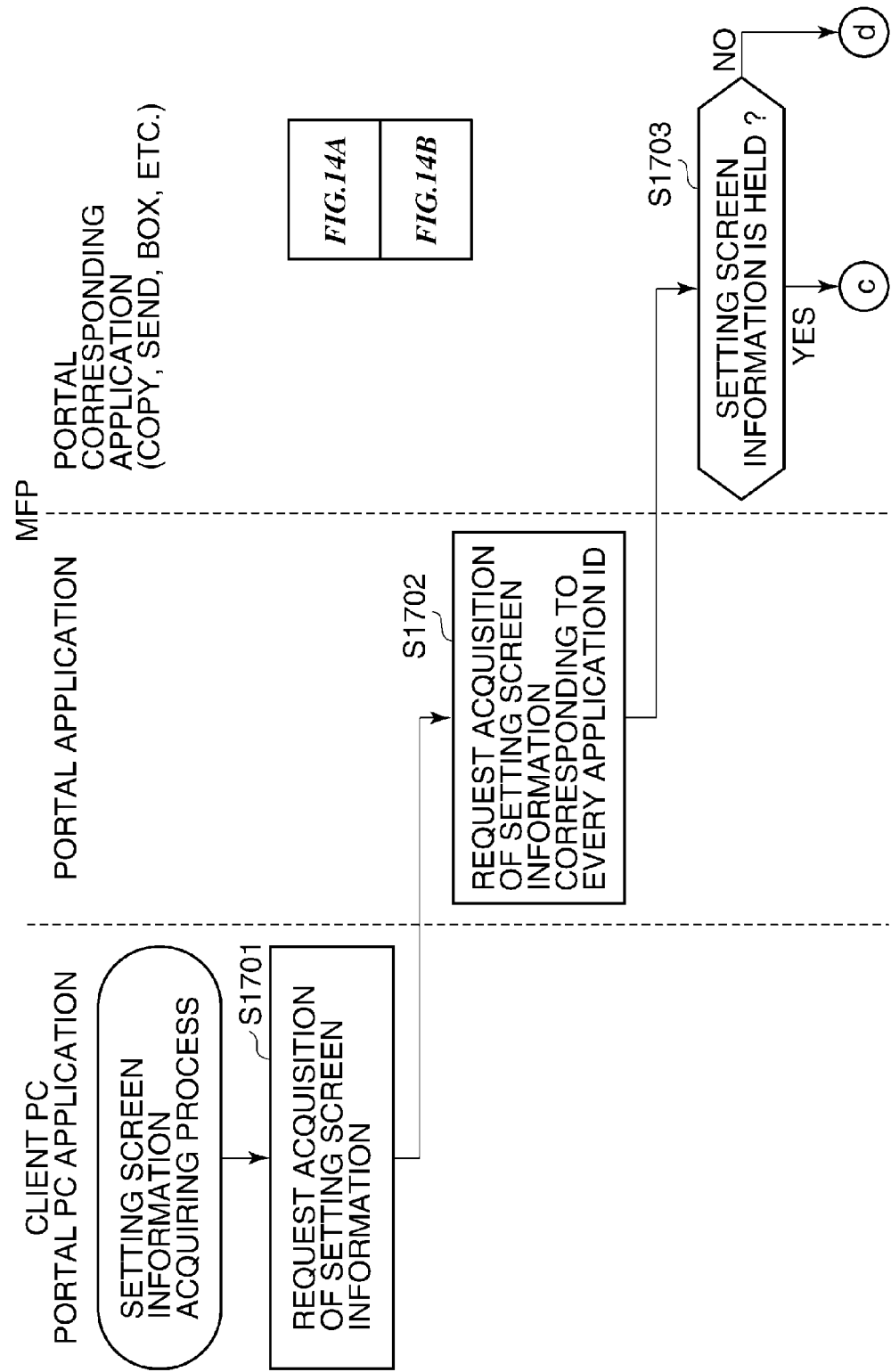

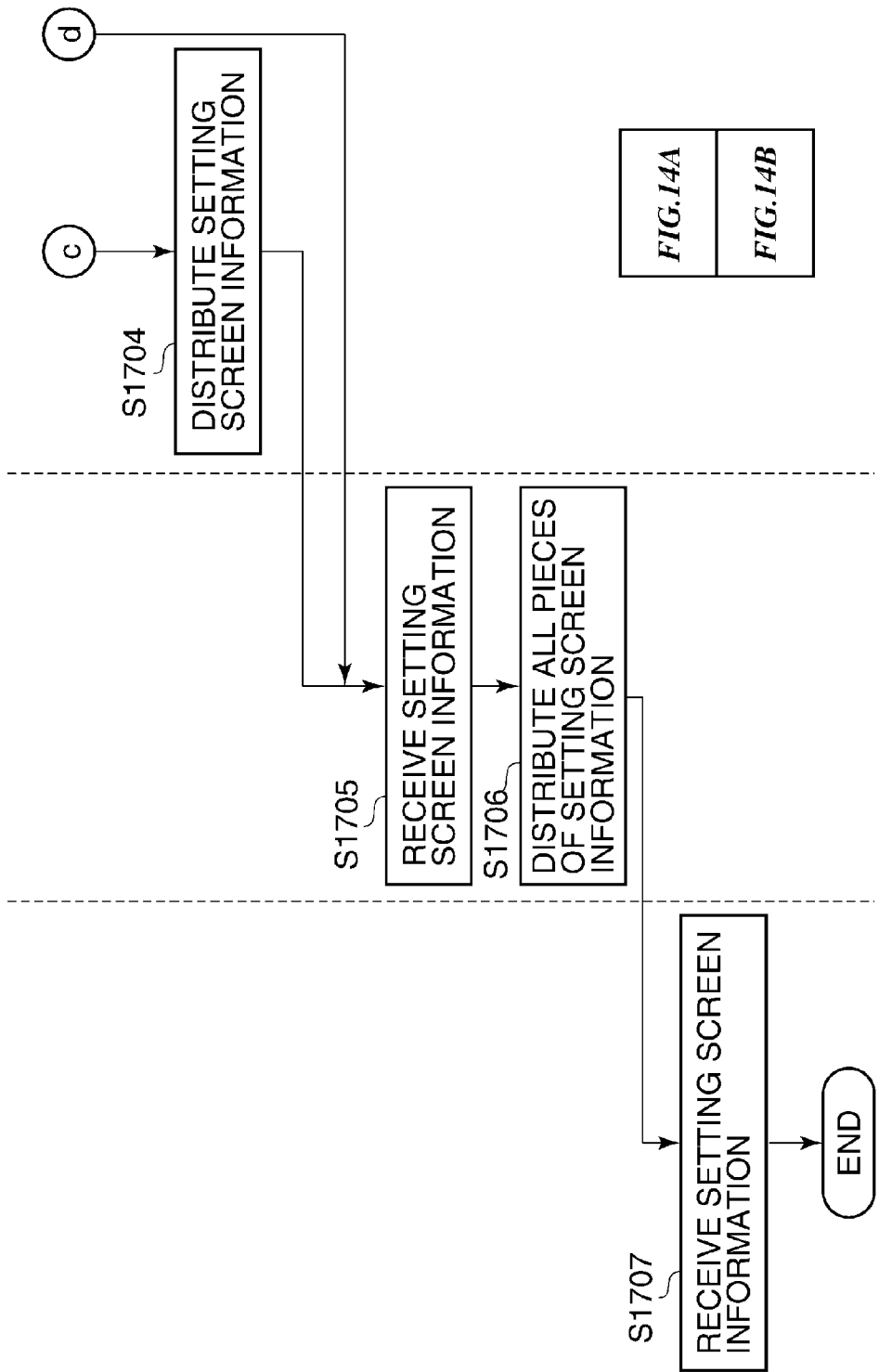

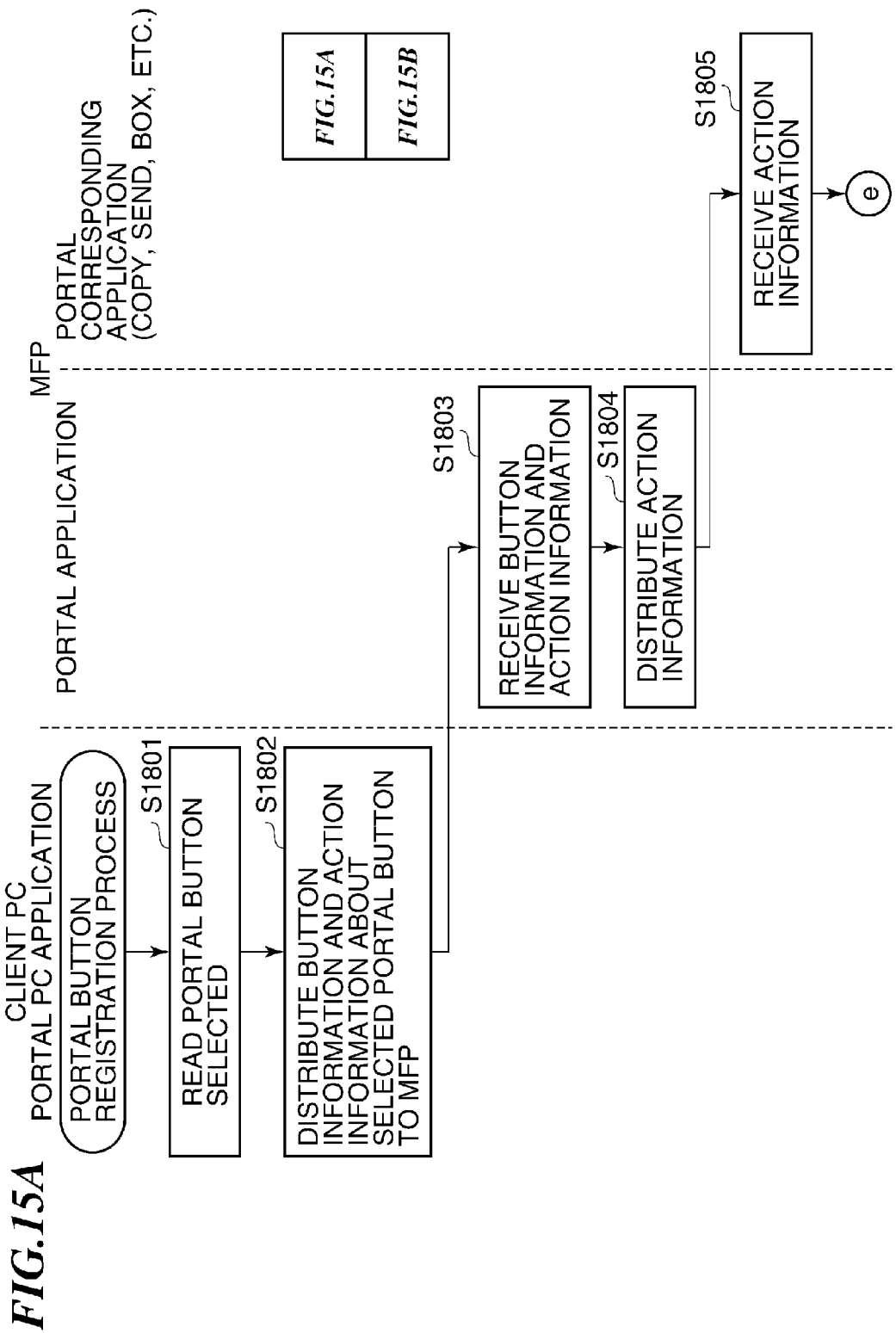

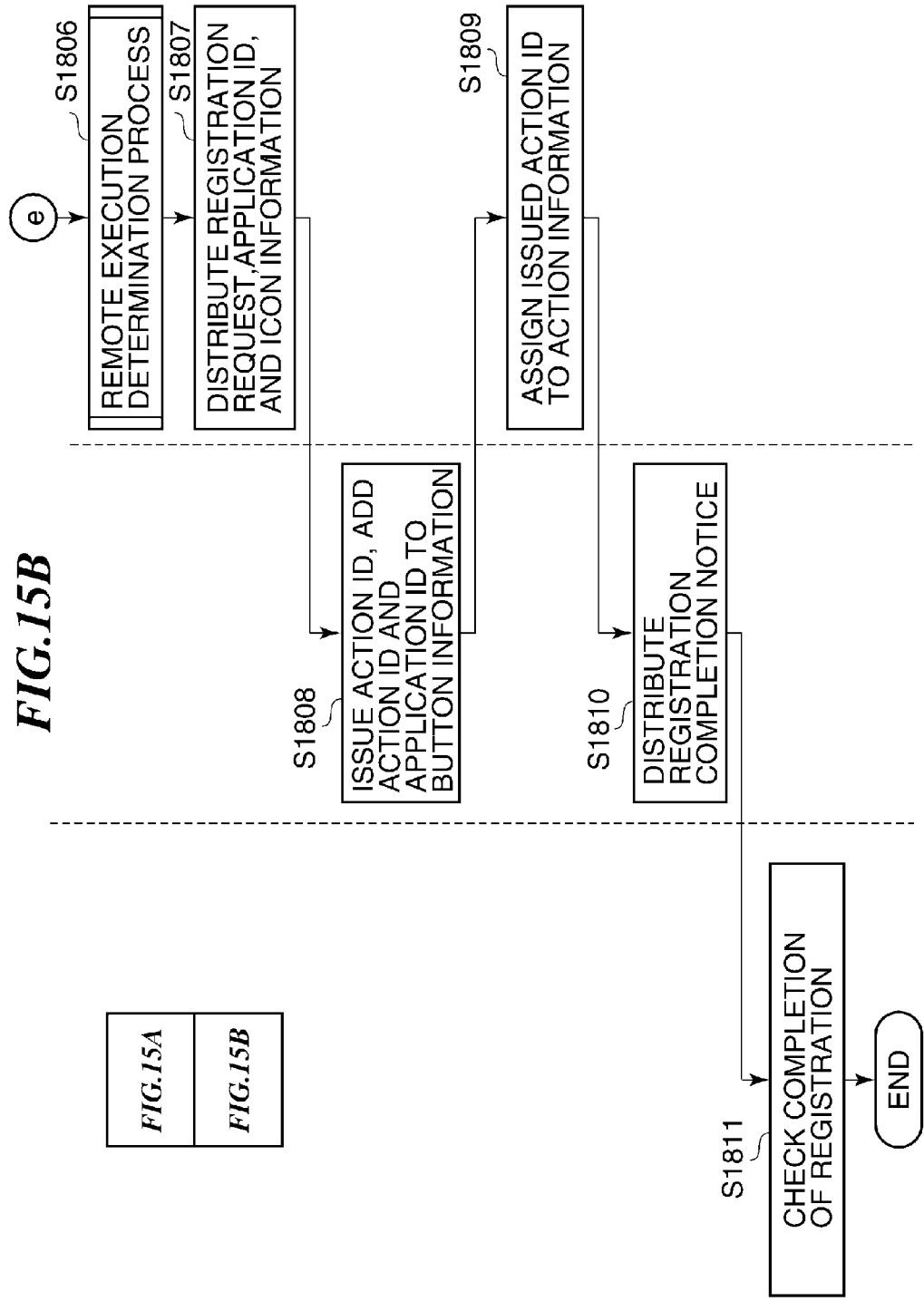

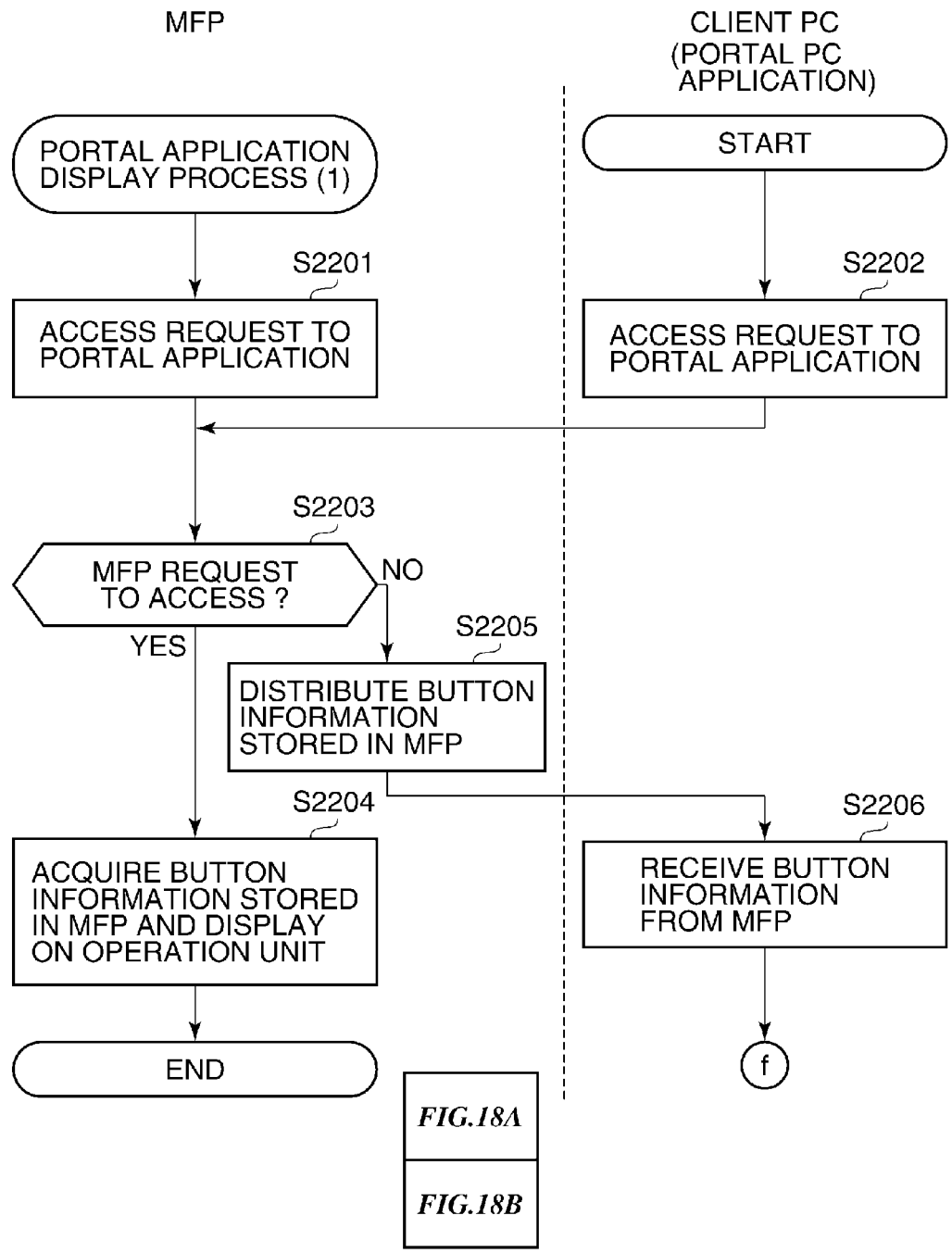

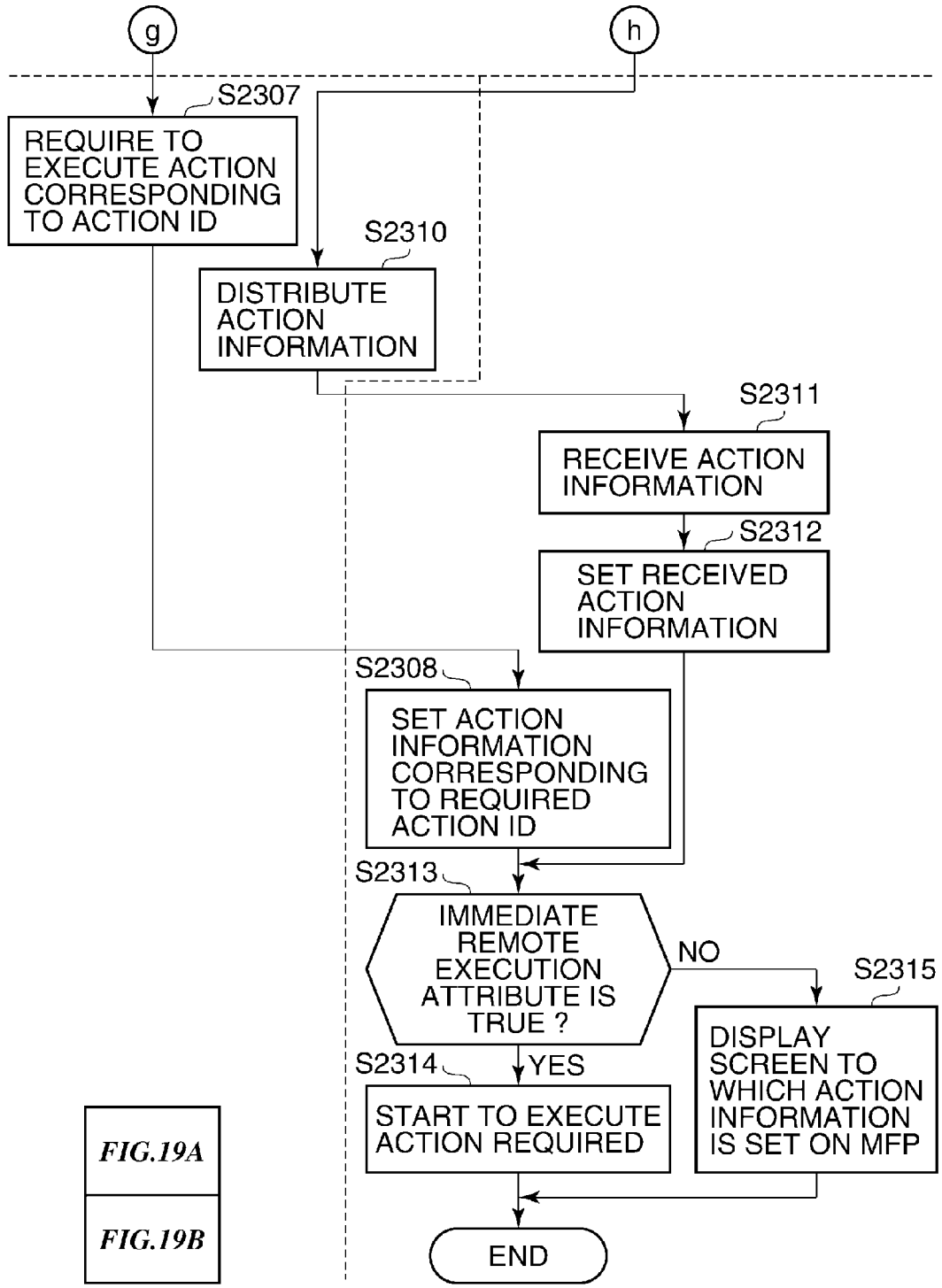

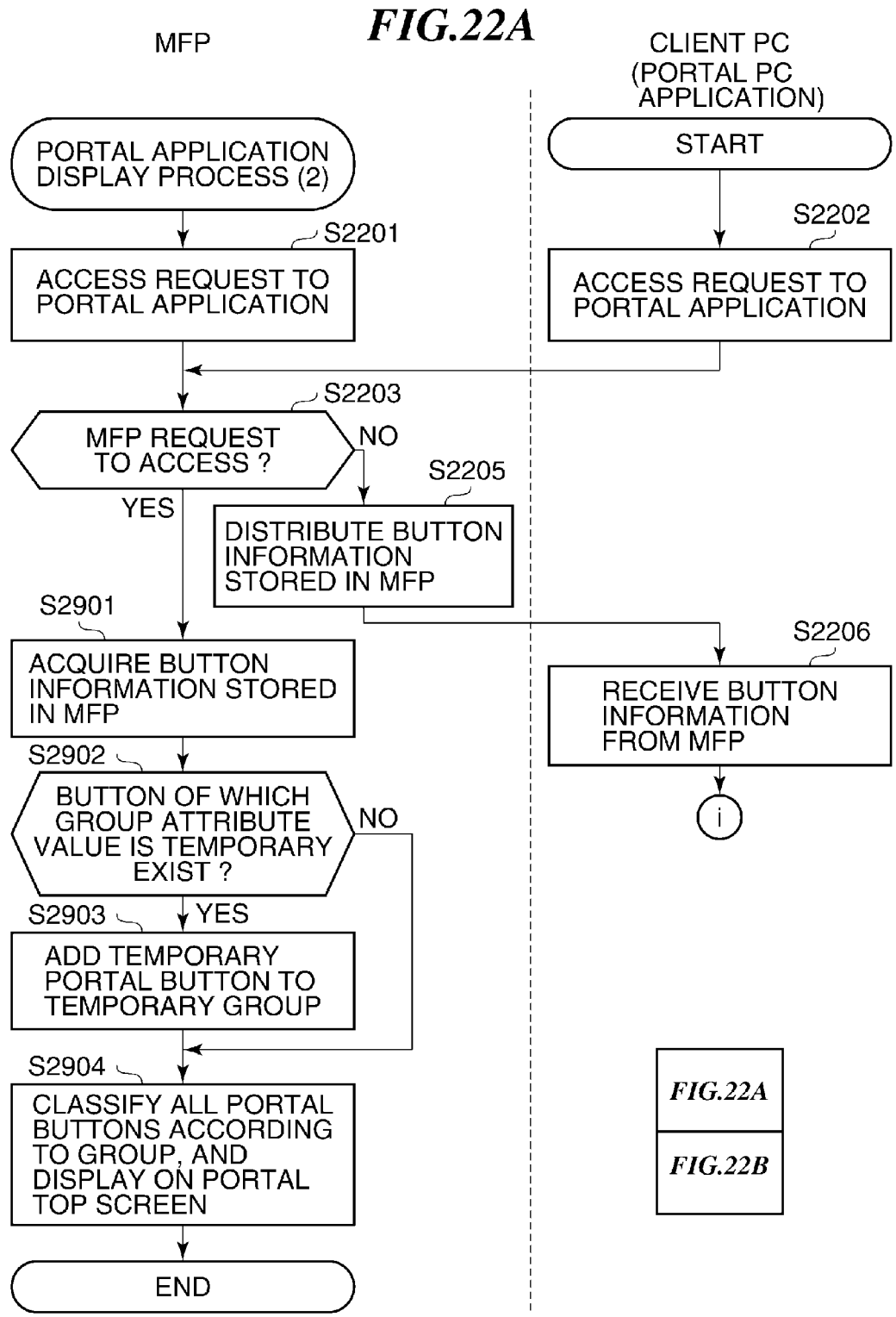

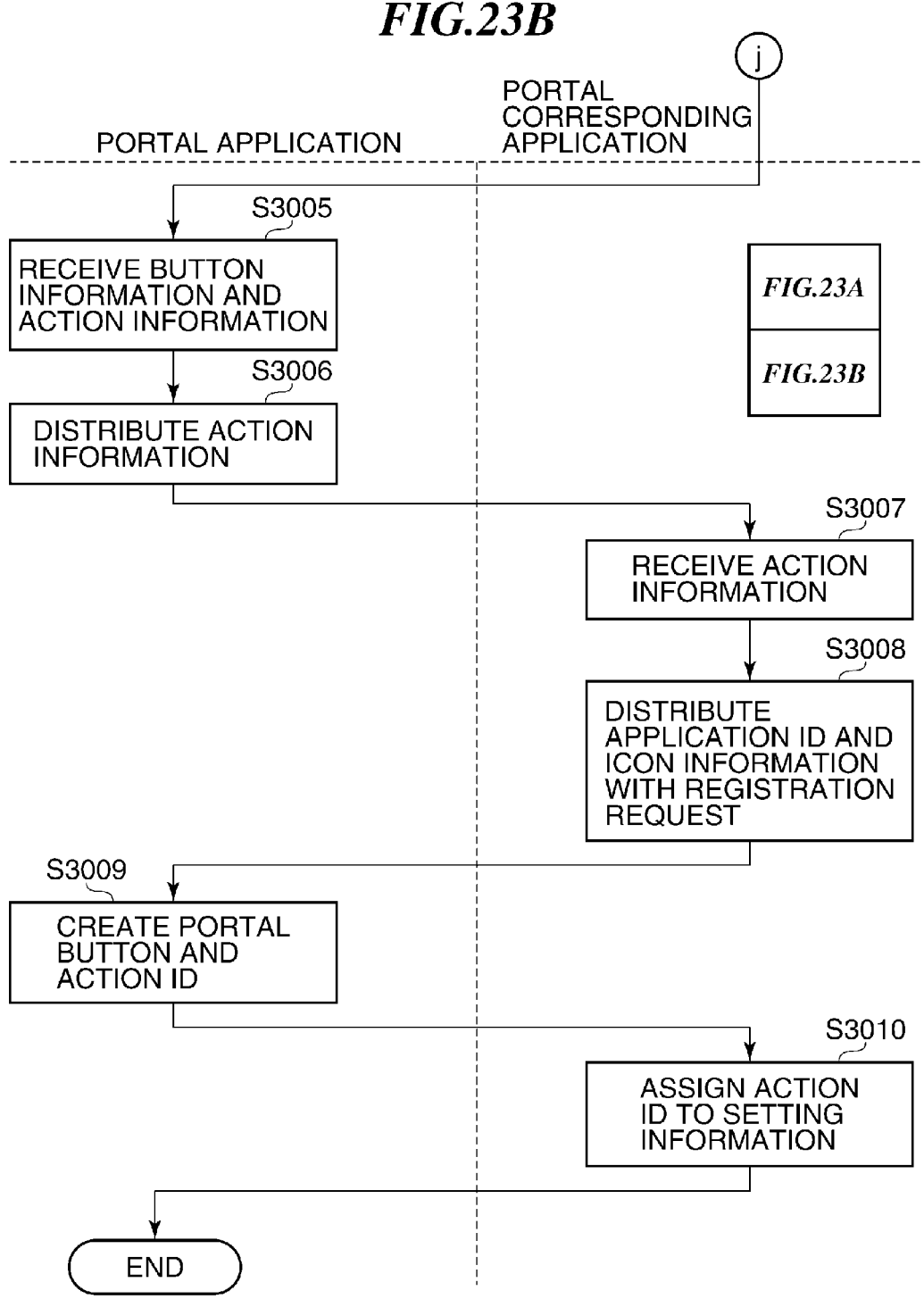

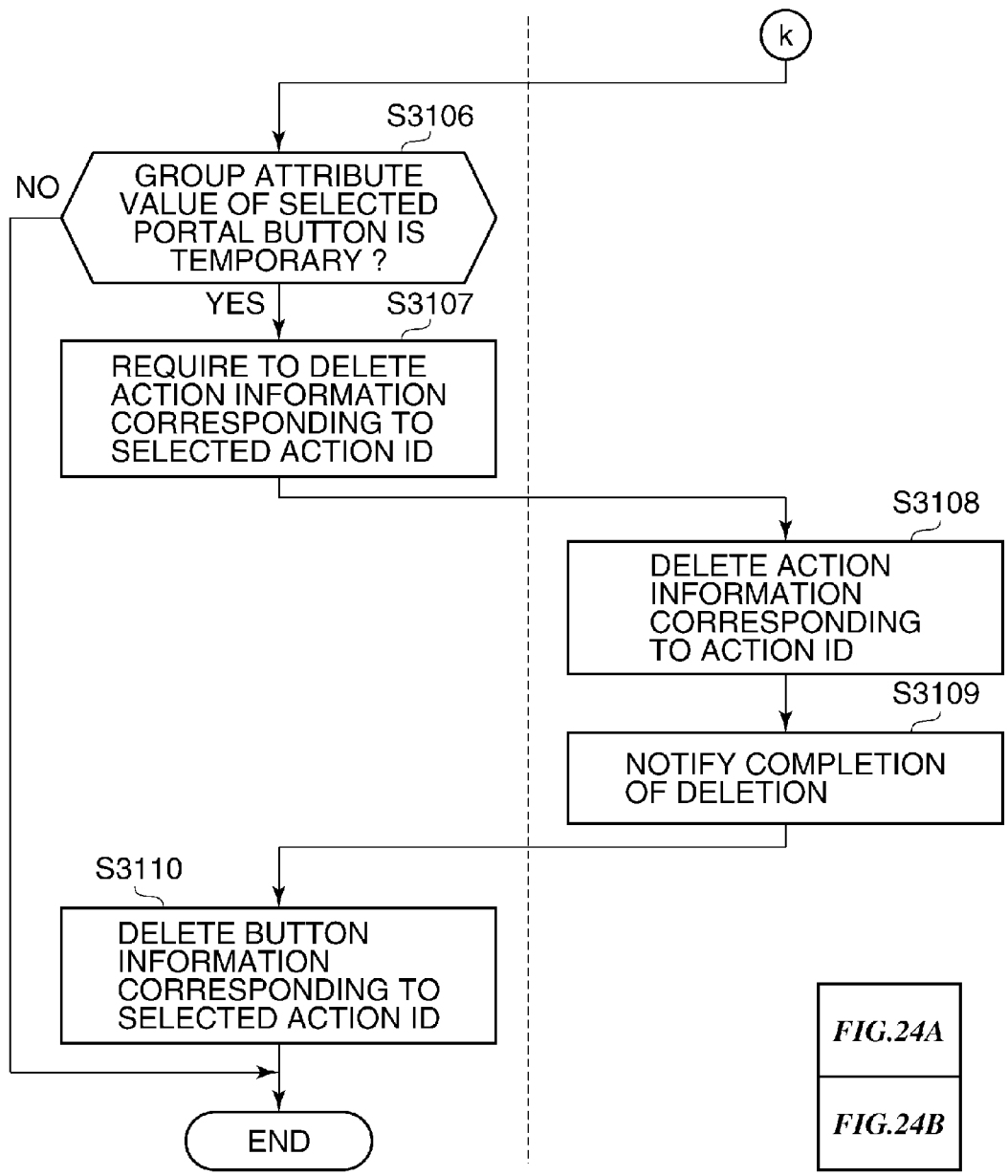

IMAGE PROCESSING APPARATUS THAT CAN BE REMOTELY CONTROLLED AND CONTROL METHOD THEREFOR

BACKGROUND OF THE INVENTION

1. Field of the Invention

The present invention relates to an image processing apparatus and a control method therefor in which setting information can be remotely controlled by a user using an information processing apparatus.

2. Description of the Related Art

Conventionally, an image processing apparatus that displays function assignment keys (shortcut keys) to which desirable functions and processes concerning settings are assigned on a display unit, and that reflects a function or a setting corresponding to a key that is selected by a user is known.

Japanese Laid-Open Patent Publication (Kokai) No. 2003-224696 (JP 2003-224696A) discloses a technique to display shortcut keys, which are the same as that displayed on a control panel of an image processing apparatus, on a remote information processing apparatus, and to make the image processing apparatus execute a function set by the shortcut key from the information processing apparatus.

However, the above-mentioned conventional technique does not consider an action in a case where a user selects a shortcut key displayed on the remote information processing apparatus corresponding to an action that requires a user's manual operation in front of the image processing apparatus.

SUMMARY OF THE INVENTION

The present invention provides an image processing apparatus that enables to distinguish whether an execution of a process in the image processing apparatus according to an instruction by a shortcut key needs a user's operation on the image processing apparatus.

Accordingly, a first aspect of the present invention provides an image processing apparatus communicable with an information processing apparatus so as to allow communication, comprising a storage unit configured to store setting information for executing a function with which the image processing apparatus is provided, an execution unit configured to execute the function according to the setting information stored in the storage unit, a determination unit configured to determine whether a user's operation to the image processing apparatus is required when the execution unit executes the function according to the setting information stored in the storage unit, an addition unit configured to add attribute information, which shows whether to permit to automatically execute the function according to the setting information based on an instruction from the information processing apparatus, to the setting information according to a determination result by the determination unit, and a sending unit configured to send the setting information to which the additional unit has added the attribute information to the information processing apparatus.

Accordingly, a second aspect of the present invention provides a control method for an image processing apparatus communicable with an information processing apparatus so as to allow communication, comprising an execution step of executing a function according to setting information stored in a storage unit for executing the function with which the image processing apparatus is provided, a determination step of determining whether a user's operation to the image processing apparatus is required when executing the function in the execution step according to the setting information stored in the storage unit, an addition step of adding attribute information, which shows whether to permit to automatically execute the function according to the setting information based on an instruction from the information processing apparatus, to the setting information according to a determination result in the determination step, and a sending step of sending the setting information to which the attribute information has added in the addition step to the information processing apparatus.

According to the present invention, the image processing apparatus enables to distinguish whether the execution of the process in the image processing apparatus according to the instruction by the shortcut key needs the user's operation on the image processing apparatus.

Further features of the present invention will become apparent from the following description of exemplary embodiments with reference to the attached drawings.

BRIEF DESCRIPTION OF THE DRAWINGS

FIG. 6A is a view showing a first example (a first embodiment) of an XML file of button information in FIG. 4.

FIG. 6B is a view showing a second example (a second embodiment) of the XML file of the button information in FIG. 4.

FIG. 7 is a view showing an example of an XML file of action information in FIG. 4.

FIG. 11 is a flowchart showing procedures of a process for connecting to the MFP executed by the portal PC application in FIG. 1.

FIG. 12A and FIG. 12B are flowcharts showing procedures of a process for importing the button information and the action information in the system in FIG. 1 to the client PC.

FIG. 14A and FIG. 14B are flowcharts showing procedures of a process for acquiring the setting screen information in FIG. 4.

FIG. 15A and FIG. 15B are flowcharts showing procedures of a portal button registration process that starts by a notice of a depression of a button registration button in FIG. 9A.

FIG. 18A and FIG. 18B are flowcharts showing procedures of a portal application displaying process that starts by an access request to the portal application in FIG. 1.

FIG. 19A and FIG. 19B are flowcharts showing procedures of a portal application execution process that starts by a portal button selection from the portal PC application in FIG. 1.

FIG. 22A and FIG. 22B are flowcharts showing procedures of the portal application displaying process that starts by the access request to the portal application in FIG. 1.

FIG. 23A and FIG. 23B are flowcharts showing procedures of the portal button execution process that starts by a portal button selection from the portal PC application in FIG. 1.

FIG. 24A and FIG. 24B are flowcharts showing procedures of the portal button execution process from the portal application in the FIG. 1 in consideration of the temporary button registered into the MFP.

DESCRIPTION OF THE EMBODIMENTS

Hereafter, embodiments according to the present invention will be described in detail with reference to the drawings.

Figure 1:
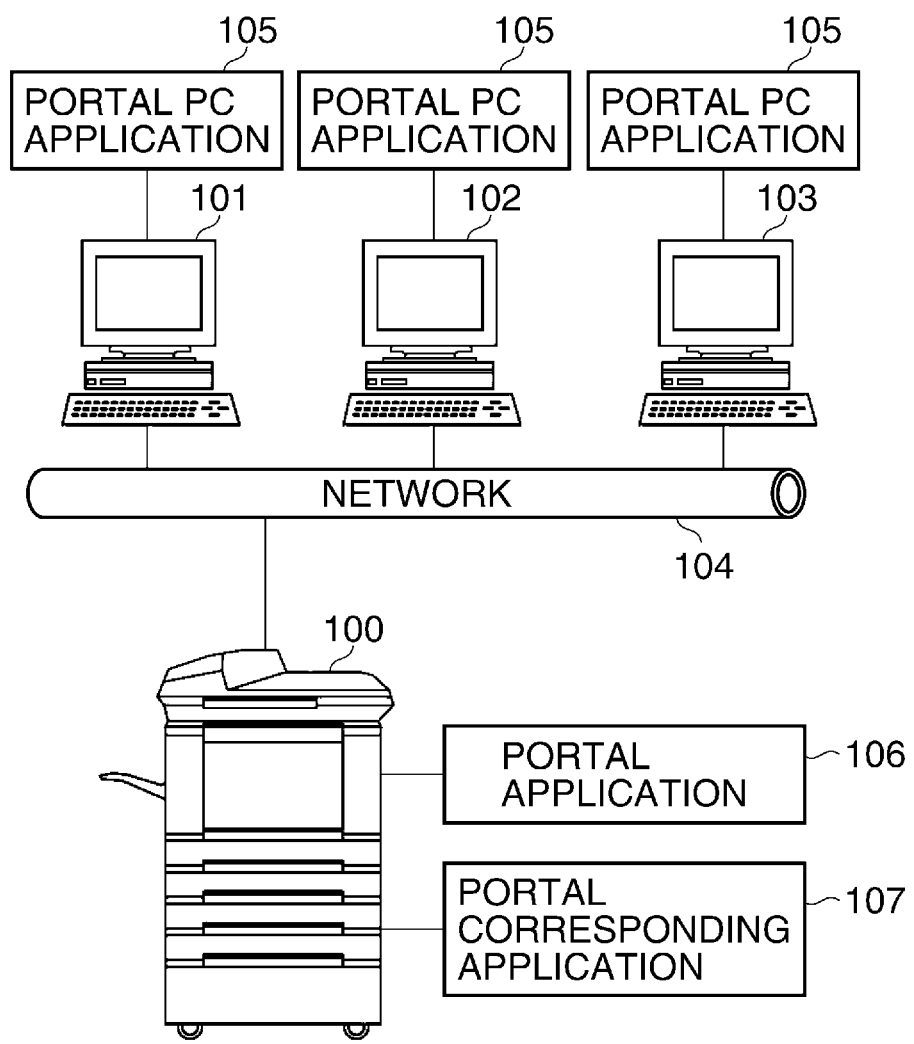
FIG. 1 is a configuration view showing an information processing system according to an embodiment of the present invention.

FIG. 1 is a configuration view an information processing system according to a first embodiment of the present invention.

An MFP (Multi-Functional Peripheral) 100 as an image processing apparatus is provided with functions for copying, for reading (scanning) an original, for printing, and for sending an image to another apparatus. Client PCs 101, 102, and 103 (they may be referred to as client PCs or PCs hereafter) as information processing apparatuses output print instructions to the MFP 100 (it may be referred to as the MFP hereafter). The client PCs store data of an original read by the MFP.

A network 104 connects the client PCs 101, 102, and 103 and the MFP 100 so that they are mutually accessible. Hardware of the network 104 enables two-way communication. A protocol used for the data transmission and reception through the network 104 may be any of existing protocols such as the HTTP (Hyper Text Transfer Protocol), the SOAP (Simple Object Access Protocol), and the FTP (File Transfer Protocol), or it may be a specific application protocol. Any number of client PCs are connectable with the network 104.

In this embodiment, an execution environment of Java (registered trademark) is built into the MFP 100, and Java (registered trademark) applications can be executed. It should be noted that a portal PC application (a generation unit) 105 mentioned later is installed in each of the client PCs 101, 102, and 103. A portal application 106 and a portal corresponding application 107 are installed in the MFP 100.

Figure 2:
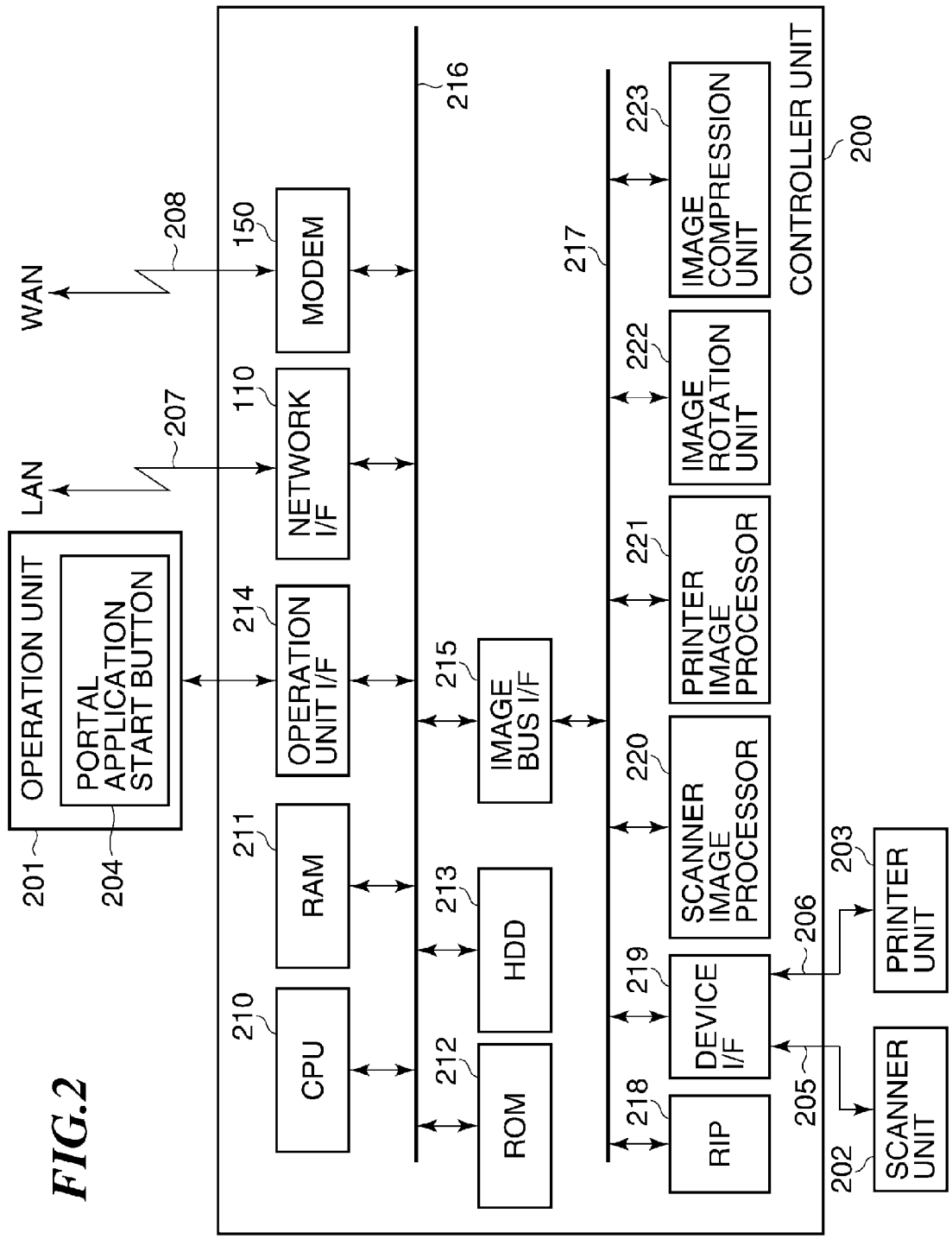
FIG. 2 is a block diagram schematically showing a system of an MFP in FIG. 1.

FIG. 2 is a block diagram schematically showing a system of the MFP 100 in FIG. 1. The MFP 100 shown in FIG. 2 is provided with a controller unit 200 that controls each part in the MFP 100, an operation unit (a display unit, an input unit) 201, a scanner unit 202, and a printer unit 203 as a basic configuration.

The operation unit 201 comprises hard keys such as a ten-digit keypad for inputting a number and a start key for executing a process, and a liquid crystal touch panel, for example, and provides a user interface for a user to operate the MFP 100. Particularly the operation unit 201 is provided with a portal application start button 204 for starting the portal application 106 mentioned later. It is possible to set up the MFP 100 and to input information to the MFP 100 by touching (pushing) icons and buttons shown on the touch panel of the operation unit 201 (or the hard keys) to indicate setup items.

The scanner unit 202 reads an image of an original etc. as image data. The printer unit 203 conveys a recording sheet and prints the image data as a visible image onto the recording sheet.

The controller unit 200 is connected to the scanner unit 202 via a bus 205 and to the printer unit 203 via a bus 206. The controller unit 200 connects to other devices through a LAN 207 or a public telephone line (WAN) 208, and controls input/output of image information and device information.

A CPU 210 is a controller that controls the whole system. A RAM 211 is a system work memory for an operation of the CPU 210, and is also an image memory for storing image data temporarily. A ROM 212 is a boot ROM. The boot program for the system is stored in the ROM 212. An HDD 213 is a hard disk drive that stores system software and image data.

A function of the MFP 100 can be added by installing an application that implements the function to use. Application programs installed in order to operate various functions on the MFP 100 are stored into the RAM 211 and the HDD 213.

An operation unit I/F 214 is an interface for the operation unit 201 that is a user interface (UI), and outputs data that should be displayed on the operation unit 201 to the operation unit 201. The operation unit I/F 214 transfers information inputted by a user through the operation unit 201 to the CPU 210.

An image bus I/F 215 is a bus bridge that connects a system bus 216 with an image bus 217 that transmits image data at high speed, and that converts a data structure.

Among devices arranged on the image bus 217, a raster image processor (RIP) 218 develops a PDL code to a bitmap image. A device I/F 219 connects the scanner unit 202 or the printer unit 203 to the controller unit 200.

A scanner image processor 220 corrects, processes, and edits inputted image data. A printer image processor 221 corrects print-output image data according to the printer unit 203, and changes a resolution.

An image rotation unit 222 rotates image data. An image compression unit 223 applies a compression/extension process such as a JPEG, a JBIG, an MMR, and an MH, and a format conversion process such as a PDF, a TIFF, an OCR, and encryption.

Figure 3:
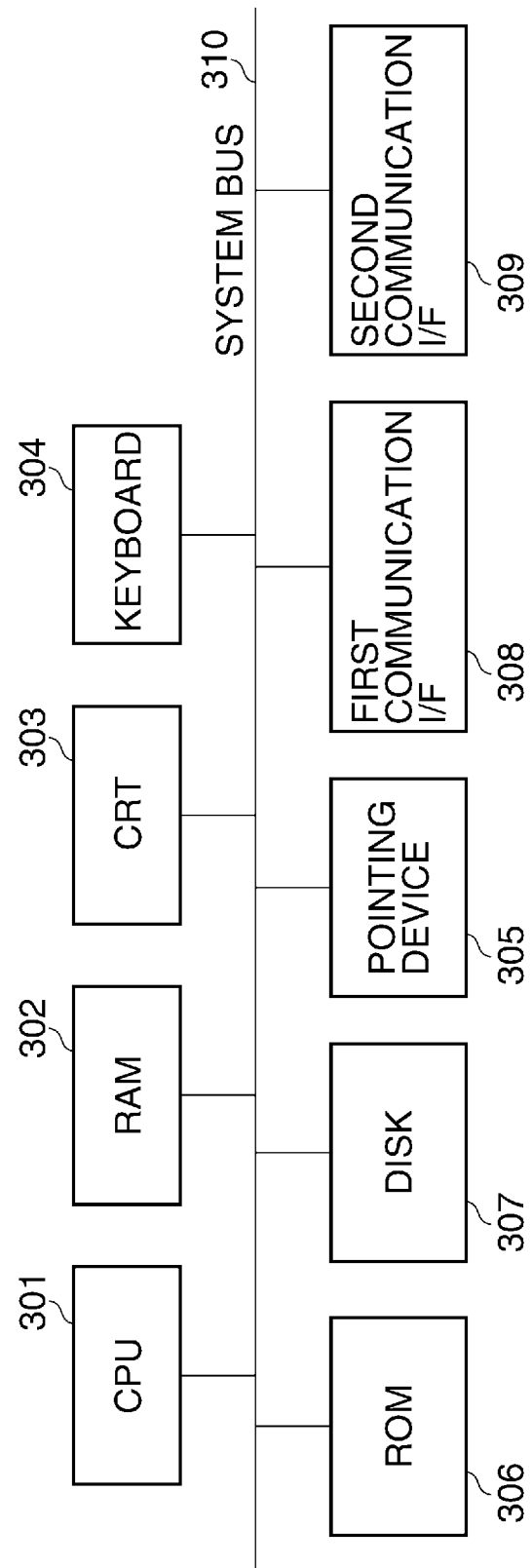
FIG. 3 is a block diagram schematically showing a system of a client PC in FIG. 1.

FIG. 3 is a block diagram schematically showing a system of the client PCs 101, 102, and 103 in FIG. 1.

The client PCs 101, 102, and 103 are configured by connecting the following modules mutually via a system bus 310. That is, the modules are a CPU 301, a RAM 302, a CRT 303, a keyboard 304, a pointing device 305, a ROM 306, a disk 307, a first communication I/F 308, and a second communication I/F 309.

A program that controls the client PC is stored in the ROM 306 or the disk 307 is read to the RAM 302 as needed and is executed by the CPU 301. The CPU 301 displays information on the CRT 303, and receives user's instructions from the keyboard 304 and the pointing device 305. The CPU 301 communicates with external apparatuses through the first communication I/F 308 and the second communication I/F 309.

In this embodiment, the CPU 301 receives a user's input from the keyboard 304 or the pointing device 305 via the system bus 310 in the client PC in FIG. 3 unless describing in particular. The CPU 301 controls the RAM 302, the CRT 303, the ROM 306, the disk 307, the first communication I/F 308, and the second communication I/F 309. The first communication I/F 308 is connected with the MFP 100 via the network 104.

Figure 4:
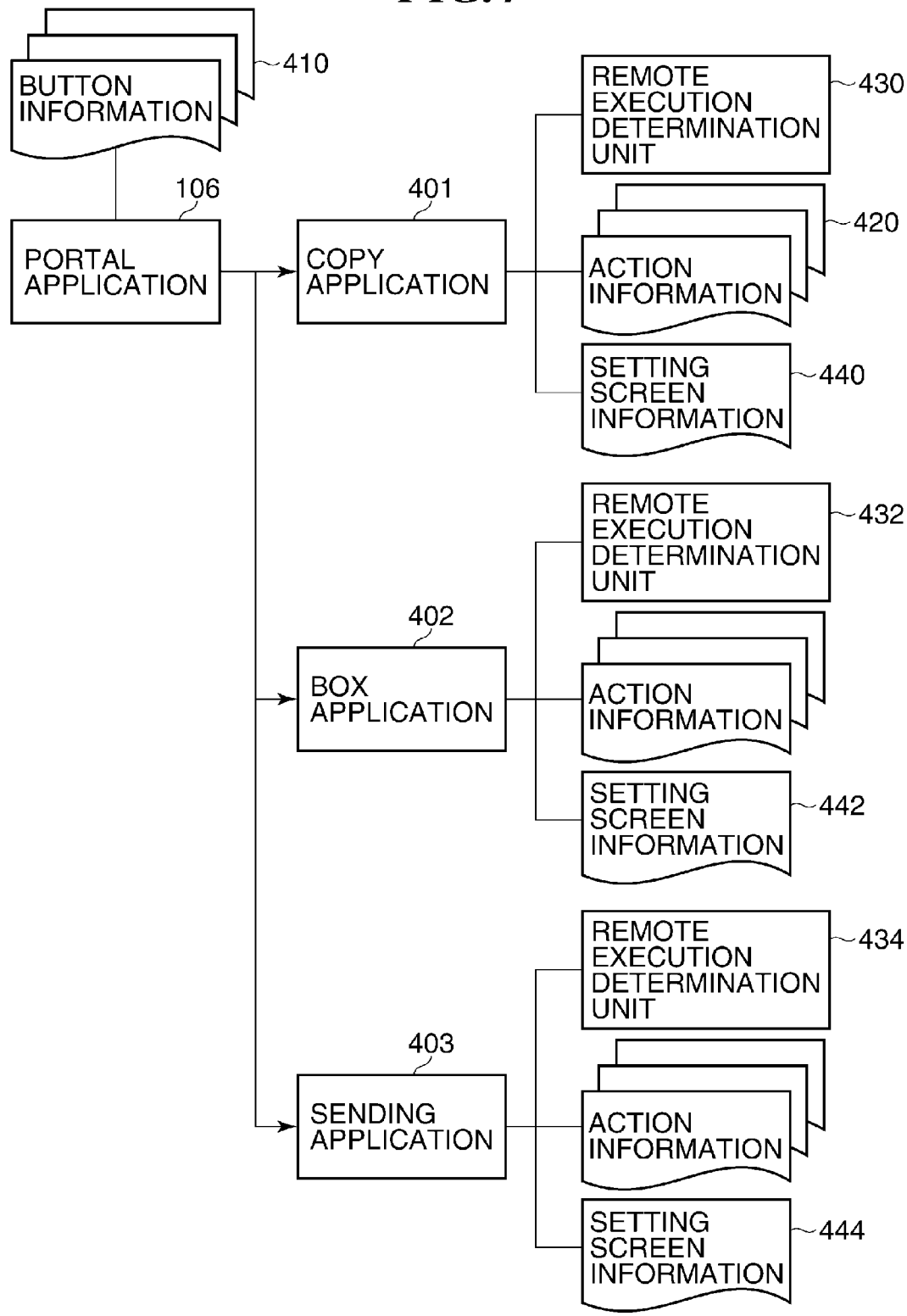
FIG. 4 is a view showing an example of a software configuration of a setting information control function (a portal application and a portal corresponding application) in the MFP in FIG. 1.

FIG. 4 is a view showing an example of a software configuration of a setting information control function (a portal application and a portal corresponding application) in the MFP 100 in FIG. 1.

The setting information control function comprises the portal application 106 and the portal corresponding application 107 (for example, a copy application 401, a box application 402, and a sending application 403).

Each of the applications stored in the HDD 213 is developed onto the RAM 211 and is executed by the CPU 210. Each of the applications displays an application screen on the operation unit 201 via the operation unit I/F 214. The portal application 106 displays a list of buttons on the operation unit 201.

Figure 5:
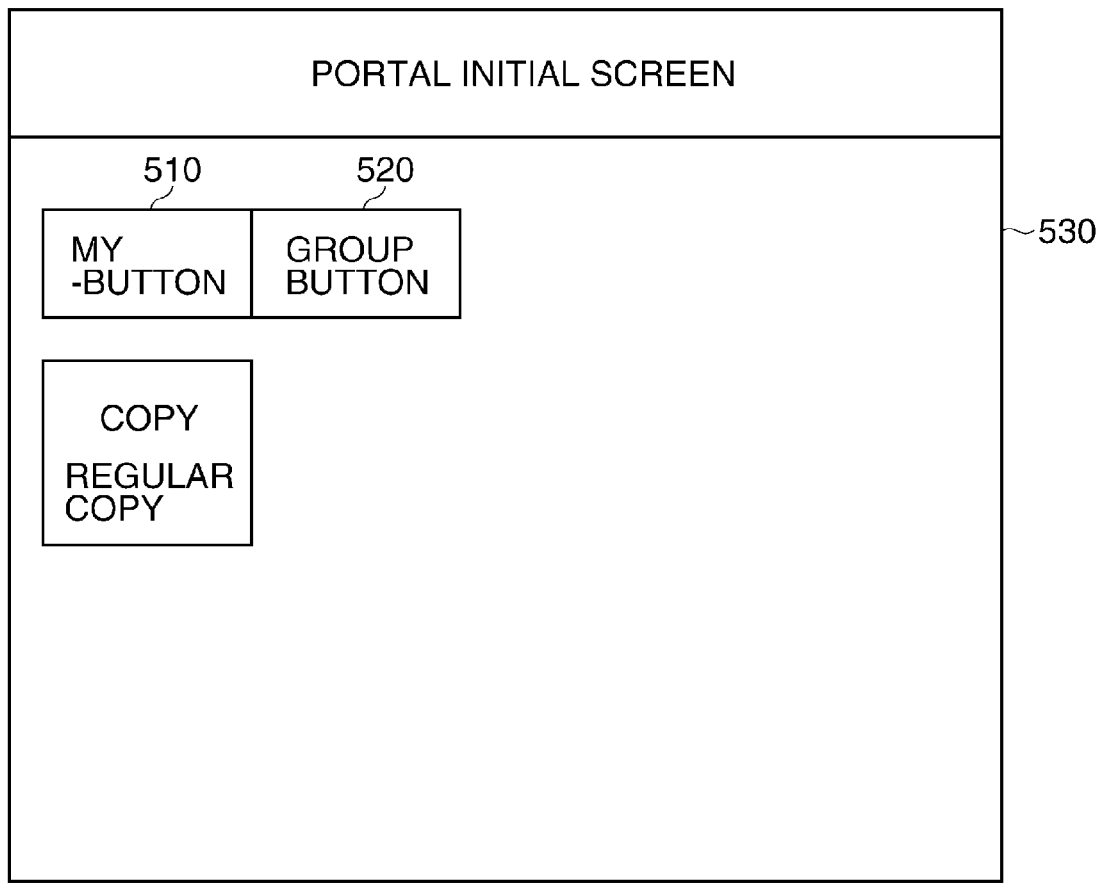
FIG. 5 is a view showing an example of a button list screen that the portal application in FIG. 4 displays on an operation unit.

FIG. 5 is a view showing an example of a button list screen that the portal application in FIG. 4 displays on the operation unit 201.

In a portal initial screen 530, a my-button (a personal button) 510 and a group button (a share button) 520 are displayed.

As shown in FIG. 4, the portal application 106 generates buttons based on button information 410 stored in the HDD 213. When the operation unit 201 notifies the portal application 106 of the depression of a button, the portal application instructs a specific application to execute a specific process according to the button information (the setting information) 410 corresponding to the button. Hereafter, a shortcut key generated by the portal application 106 will be written as a portal button.

FIG. 6A is a view showing a first example of data of the button information 410 in FIG. 4 in the XML (extensible Markup Language) format.

The XML shown in FIG. 6A denotes the button information 410 of the copy application 401. A button display name displayed on an application screen is a "REGULAR MEETING RECORD". The XML shown in FIG. 6A means instructing an application specified by an application ID001 (the copy application in this case) to execute a process that is uniquely specified by an action ID001, when the depression of the button is notified from the operation unit 201.

A group attribute 605 is classified under four groups including a personal button stored in the MFP, a personal button stored in the client PC, a group button stored in the MFP, and a group button stored in the client PC. The group attribute 610 shown in FIG. 6A means the personal button of the MFP 100. The copy application 401 displays the setting screen for executing a copy process. It should be noted that FIG. 6B is a view showing a second example of the XML file of the button information in FIG. 4, it will be described later.

FIG. 7 is a view showing an example of data of action information 420 in FIG. 4 in the XML format.

The action information describes the setting information about the function (the application) of the MFP, and is linked with the button information by an application ID and an action ID. By pushing a desired button in the screen shown in FIG. 5, a user can call a desired setting of the desired function. Accordingly, the time and trouble of a user who operates the MFP can be saved.

FIG. 7 shows the setting information about the copy application 401 as an example of the action information. In FIG. 7, it is set that an original is read in a real magnification and is copied under an automatic color setting, a density of "−1" (one step darker), and an automatic sheet selection among various copy settings. The action information is provided with the immediate remote execution attribute 810 (the attribution information). When the immediate remote execution attribute 810 is true, the copy application 401 not only sets up a function, but starts a copy operation in response to a call of the action information from remoteness. In the example of the action information in FIG. 8, since the immediate remote execution attribute 810 is false, when a button is selected from the portal PC application 105 mentioned later, a setting described in the action information is only permitted and the immediate execution of the copy operation is restricted.

The box application 402 stores the image data that is generated by scanning the original by the scanner unit 202 into the HDD 213. The sending application 403 sends the image data that is generated by scanning the original by the scanner unit 202 to a predetermined address by various protocols. Each application displays its own setting screen, and executes a process according to the inputted setting information or the action information 420 as with the copy application 401.

The remote execution determination units 430, 432, and 434 of the respective applications determine whether a manual operation or a work by a user in front of the MFP 100 is necessary when the action related to the portal button of the application is executed from the remote client PC 101.

For example, when the copy application 401 performs the copy operation, when the box application 402 stores the scanned image, or when the sending application 403 sends the scanned image through the network 104, the following actions are required. That is, a user is required to come in front of the MFP 100 and to set an original to the scanner unit 202. Accordingly, the remote execution determination units 430, 432, and 434 determine whether the portal button can be immediately executed from remoteness based on the action information 420 about the portal button that needs such an action.

The setting screen information 440, 442, or 444 that is included in each application is necessary to generate a screen for operating the portal button on the portal PC application 105 from the client PC 101. According to the demand from the portal PC application 105, the setting screen information 440, 442, or 444 is sent to the portal PC application 105.

The portal buttons are divided into groups (group classification) and the buttons of the group selected by the user are displayed. When pushing the my-button 510 or the group button 520, the display is changed so that the buttons of the group that is different from the currently displayed group are displayed. The group button 520 is used in order to display the portal buttons that all the users use in common. The group button 520 comprises the button information 410 and the action information 420 as well as the my-button 510.

On the other hand, the my-button 510 is used in order to display the portal buttons registered for each individual. Therefore, user authentication is performed before displaying the portal initial screen 530, and the my-button 510 becomes inoperable for a user whose authentication becomes error. It should be noted that the user authentication in this embodiment uses a general method such as password authentication and biometric authentication, and a detailed description thereof is omitted.

Figure 8:
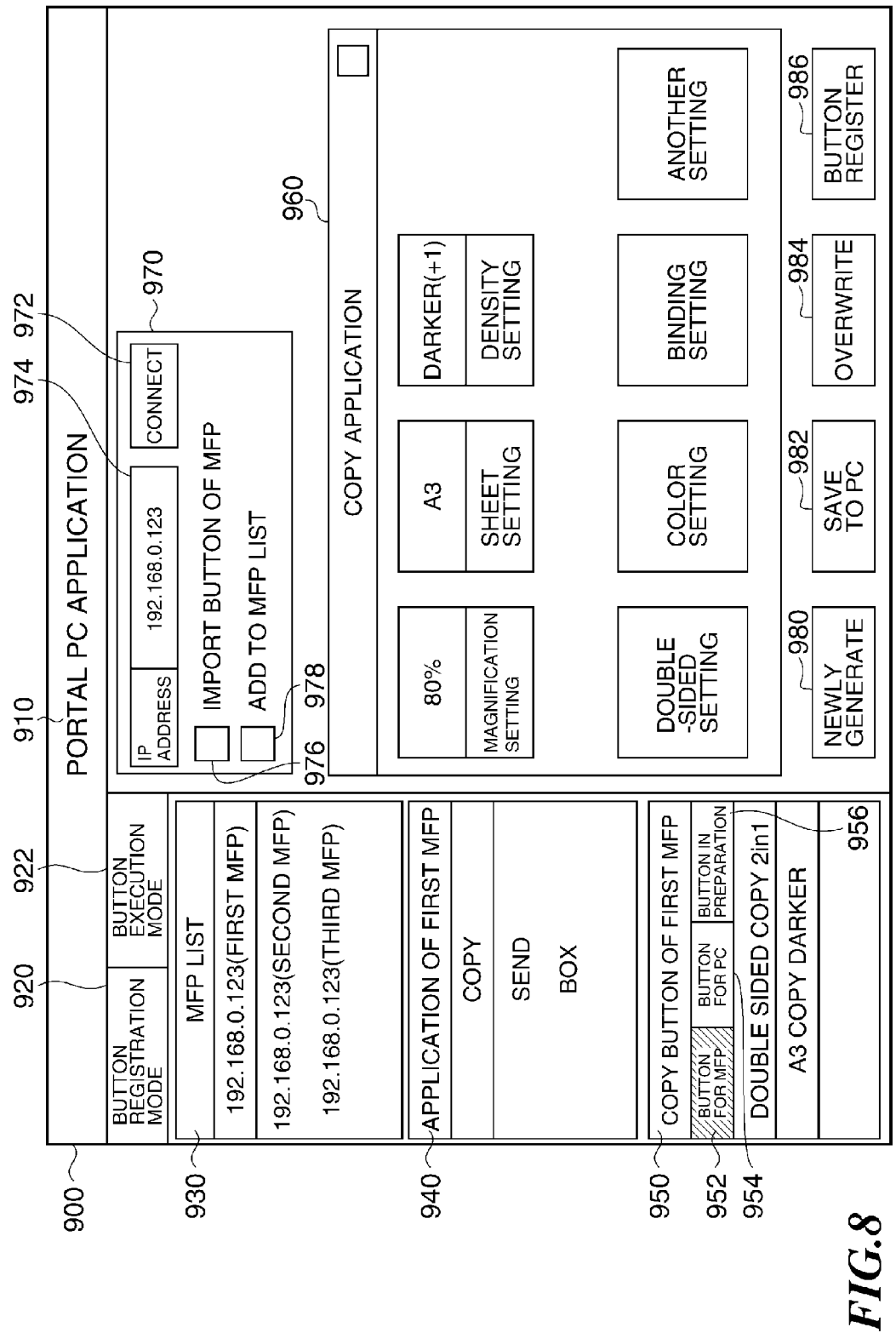
FIG. 8 is a view showing an example of a screen in a button registration mode displayed by a portal PC application in FIG. 1.
Figure 9A:
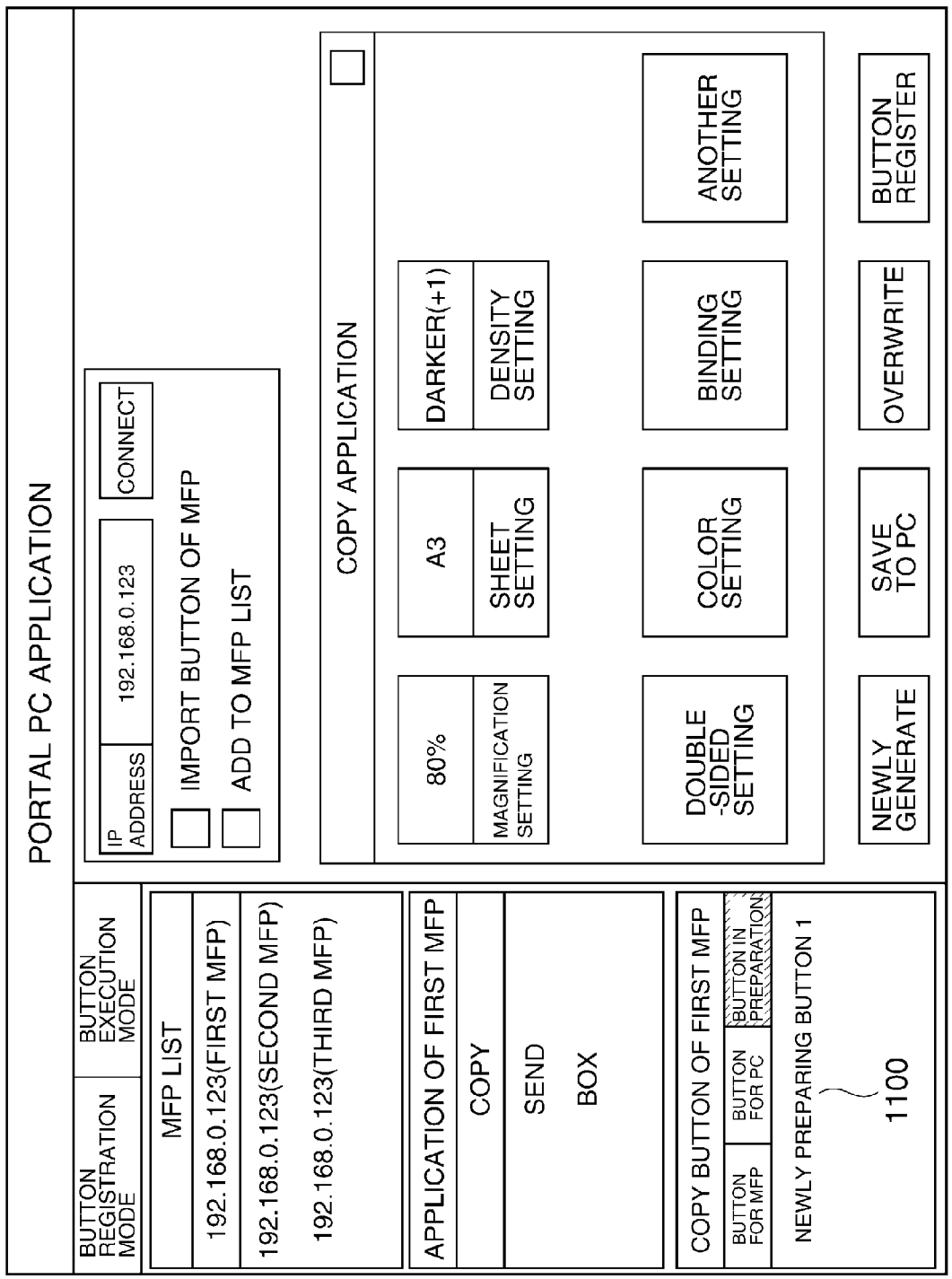
FIG. 9A is a view showing an example of a screen for generating a PC button displayed by the portal PC application in FIG. 1.
Figure 9B:
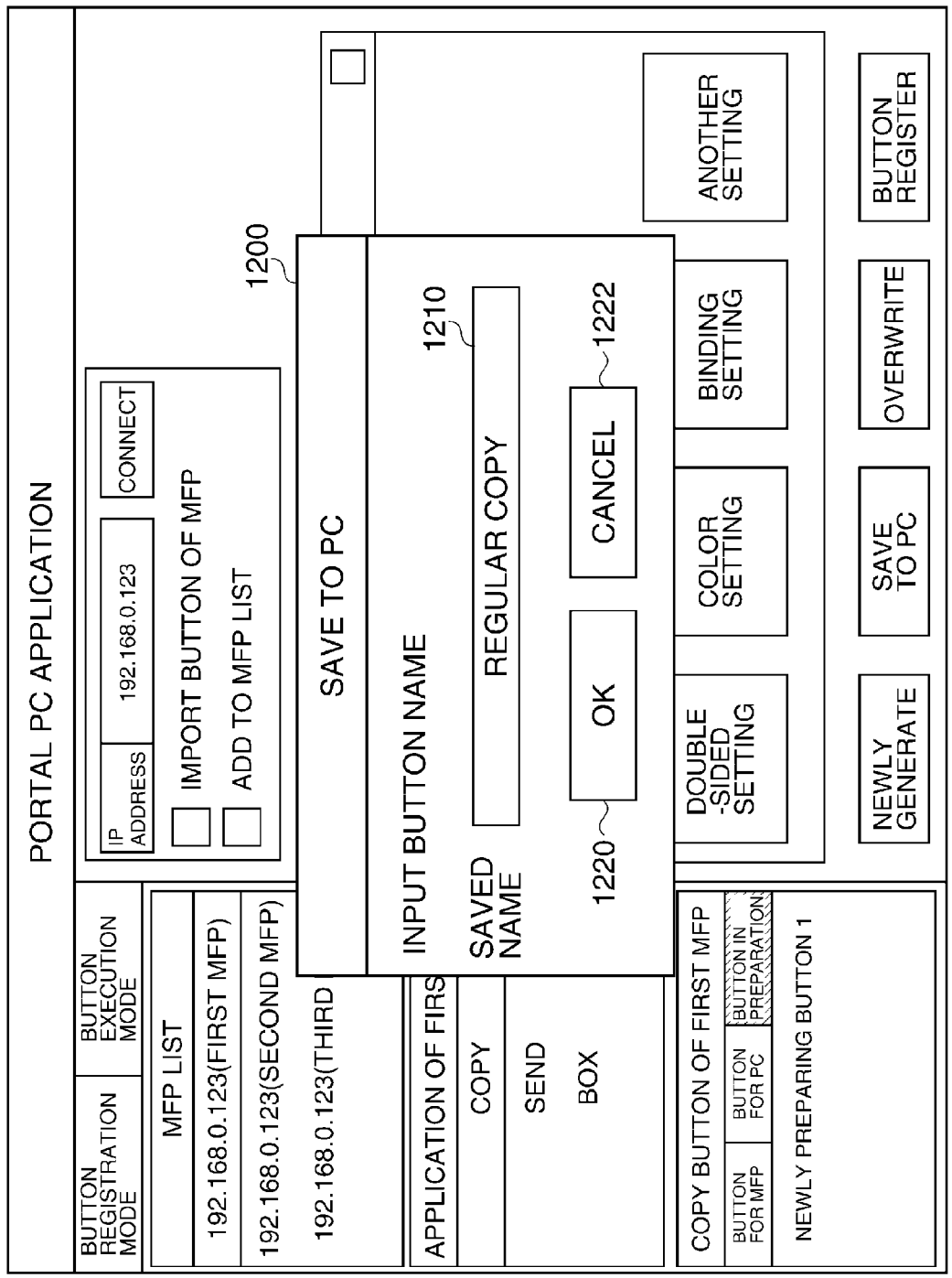
FIG. 9B is a view showing an example of a screen for saving the PC button displayed by the portal PC application in FIG. 1.

FIG. 8, FIG. 9A, and FIG. 9B are views showing examples of the UI of the portal PC application 105 in FIG. 1 in a button registration mode.

The portal PC application 105 is software for the client PC 101 for generating a portal button and for making the MFP 100 perform setting related to the button. A top menu 910 shows the name of the portal PC application 105. A button registration mode button 920 is used in order to shift the mode of the MFP 100 to the button registration mode for registering the portal buttons.

A button execution mode button 922 is used in order to shift the mode of the MFP 100 to a button execution mode for executing a process directed by the portal button. An MFP list 930 shows the MFPs registered as being operable from the portal PC application 105. This case shows that three sets of MFPs are registered.

An MFP application list 940 shows the portal corresponding applications of the MFP selected in the MFP list 930. This case shows that a first MFP has a copy application, a sending application, and a box application.

A portal button list 950 displays registered buttons for the portal corresponding applications of the selected MFP. Types of buttons registered are classified into three groups including a button for MFP, a button for PC, and a button in preparation. When one of an MFP button 952, a PC button 954, and a preparation button 956 is selected, registered buttons of the selected type will be displayed.

The button for MFP denotes a portal button stored in the HDD 213 of the MFP. The button for PC denotes a portal button stored in the disk 307 of the client PC 100. The button in preparation denotes a button that is currently prepared by the portal application 105. In the example in FIG. 8, the MFP button 952 is selected and highlighted, buttons of "DOUBLE-SIDED COPY 2 in 1" and "A3 COPY DARKER" are displayed as buttons for the copy application of the first MFP.

A portal button applet 960 is a screen generated from the setting screen information that the portal corresponding application holds. The example in FIG. 8 shows the screen that is generated based on the setting screen information 440 of the copy application 401.

When the PC button 954 is selected, the PC button 954 is highlighted, and the information on the portal button applet 960 is also changed. When a connection button 972 in a connection menu 970 is selected, the client PC is connected to the MFP via the network 104 with reference to a connection destination IP address 974.

When an importation setting check box 976 is checked, the portal buttons that the MFP of the connection destination holds are imported to the client PC temporarily at the time of connection. When an MFP additional setting check box 978 is checked, the MFP as the connection destination is displayed on the MFP list 930 at the time of connection. It should be noted that an authentication screen dialog (not shown) is displayed when the authentication is valid.

When a "NEWLY GENERATE" button 980 is selected, a button of the selected application is generated and is notified to the portal application 106. Then, the preparation button 956 is selected and highlighted, and a newly preparing button 1100 (FIG. 9A) is registered and displayed.

When a "SAVE TO PC" button 982 is selected, a save-to-PC dialog 1200 (FIG. 9B) is displayed. When a saved name 1210 is inputted and an OK button 1220 is selected, the button information 410 and the action information 420 about the button in preparation are saved into the disk 307 as a new button. When a cancel button 1222 is selected, the saving action is canceled.

Figure 10:
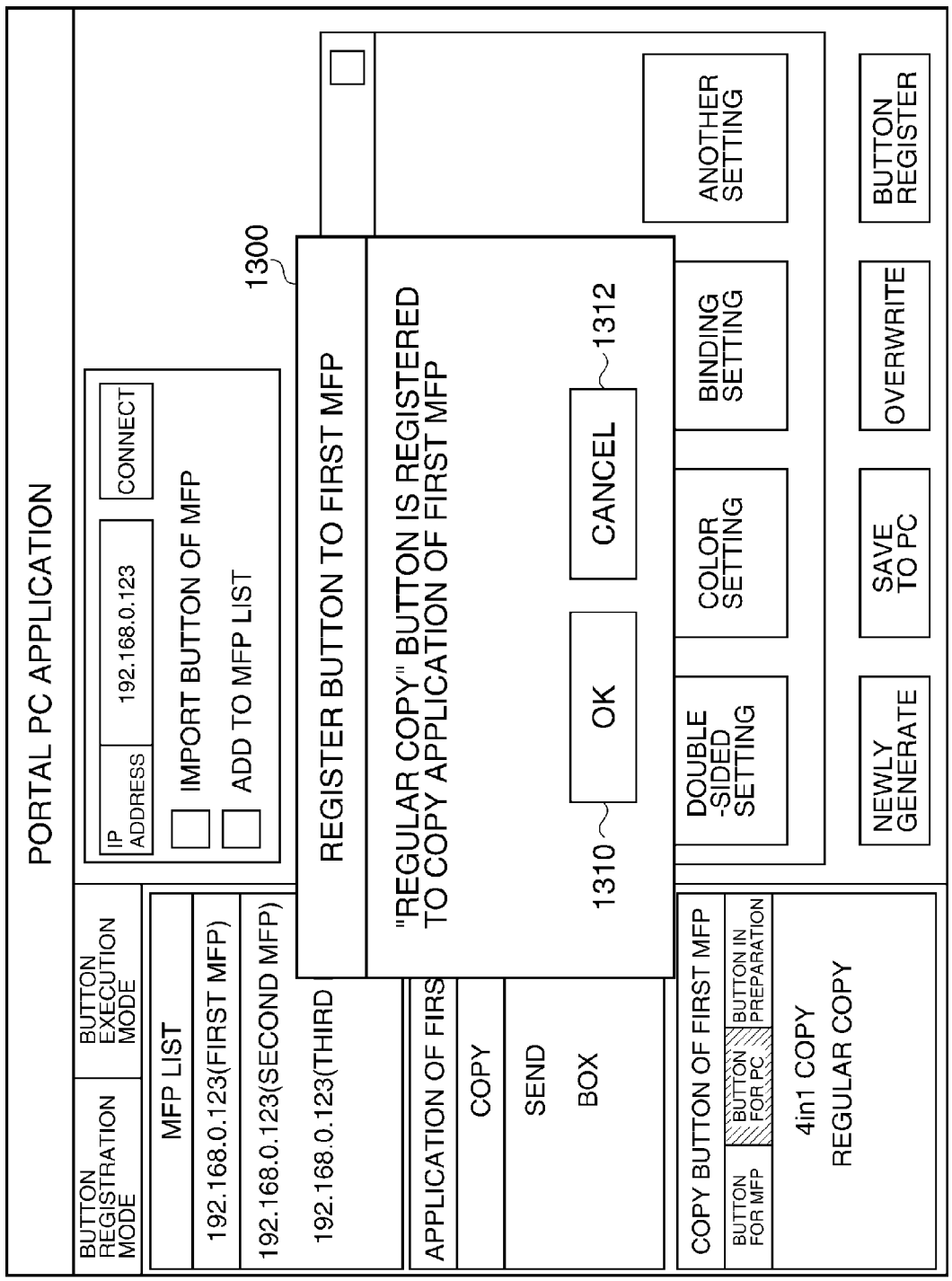
FIG. 10 is a view showing an example of a screen for registering a button to the MFP displayed by the portal PC application in FIG. 1.

When an "OVERWRITE" button 984 is selected, the information about the button in preparation overwrites the information about the existing button, and is saved into the disk 307. When a "BUTTON REGISTER" button 986 is selected, a button registration dialog 1300 (FIG. 10) is displayed. When an OK button 1310 is selected on the dialog, the selected button is registered to the selected MFP via the network 104. When a cancel button 1312 is selected, the registering action is canceled.

FIG. 11 is a flowchart showing procedures of a process for connecting the portal PC application 105 to the MFP 100 in FIG. 1. A reference sign S is attached to each process step.

In S1401, the portal PC application 105 reads the connection destination IP address 974, and the settings of the importation setting check box 976 and the MFP additional setting check box 978, which are set by the user in the connection menu 970 into the RAM 302 or the disk 307. The portal PC application 105 establishes connection with the MFP 100 through the network 104 based on the read information. In this embodiment, general methods are used for the connection method and the authentication method, and detailed descriptions thereof are omitted.

When the connection between the clients PC 101 and the MFP 100 cannot be established at this time (NO in S1402), the portal PC application 105 cancels connection with the MFP 100 and finishes the process. When the connection between the clients PC 101 and the MFP 100 is established (YES in S1402), the button information 410 and the action information 420 that the MFP 100 holds in the HDD 213 are imported to the client PC 101 (S1403). Details of the button importation will be described below.

And the client PC acquires the setting screen information that the portal corresponding application 107 installed in the MFP 100 holds (S1404). Details of the setting screen information acquisition process will be described below. The portal PC application 105 determines whether the MFP additional setting check box 978 is valid or invalid (S1405). If valid, the portal PC application 105 adds the connected MFP to the MFP list 930 (S1406).

FIG. 12A and FIG. 12B are flowcharts showing procedures of a process for importing the button information 410 and the action information 420 in FIG. 4 to the client PC (the importation process for the portal button in S1403).

The portal PC application 105 determines whether the importation setting is valid or invalid (S1501). If invalid, the process is finished. If valid, the portal PC application 105 requests distribution of the button information 410 and the action information 420 from the MFP 100 (S1502).

Receiving the request, the portal application 106 reads the button information 410 of the my-button 510 and the group button 520 (S1503). The portal application 106 requests acquisition of the action information corresponding to each piece of the button information from the portal corresponding application 107 (S1504).

Receiving the request, the portal corresponding application 107 reads the requested action information (S1505). The portal corresponding application 107 determines whether the value of the immediate remote execution attribute of each piece of the action information is set in the remote execution determination unit 430 (S1506). When it is not set, the portal corresponding application 107 executes a remote execution determination process mentioned later (S1507).

When the immediate remote execution attribute has been already set or after setting, the portal corresponding application 107 distributes the requested action information 420 to the portal application 106 (S1508). The portal application 106 distributes the button information 410 and the action information 420 received from the portal corresponding application 107 to the portal PC application 105 (S1509).

The portal PC application 105 receives the button information 410 and the action information 420 (S1510), and finishes the portal button importation process.

Figure 13:
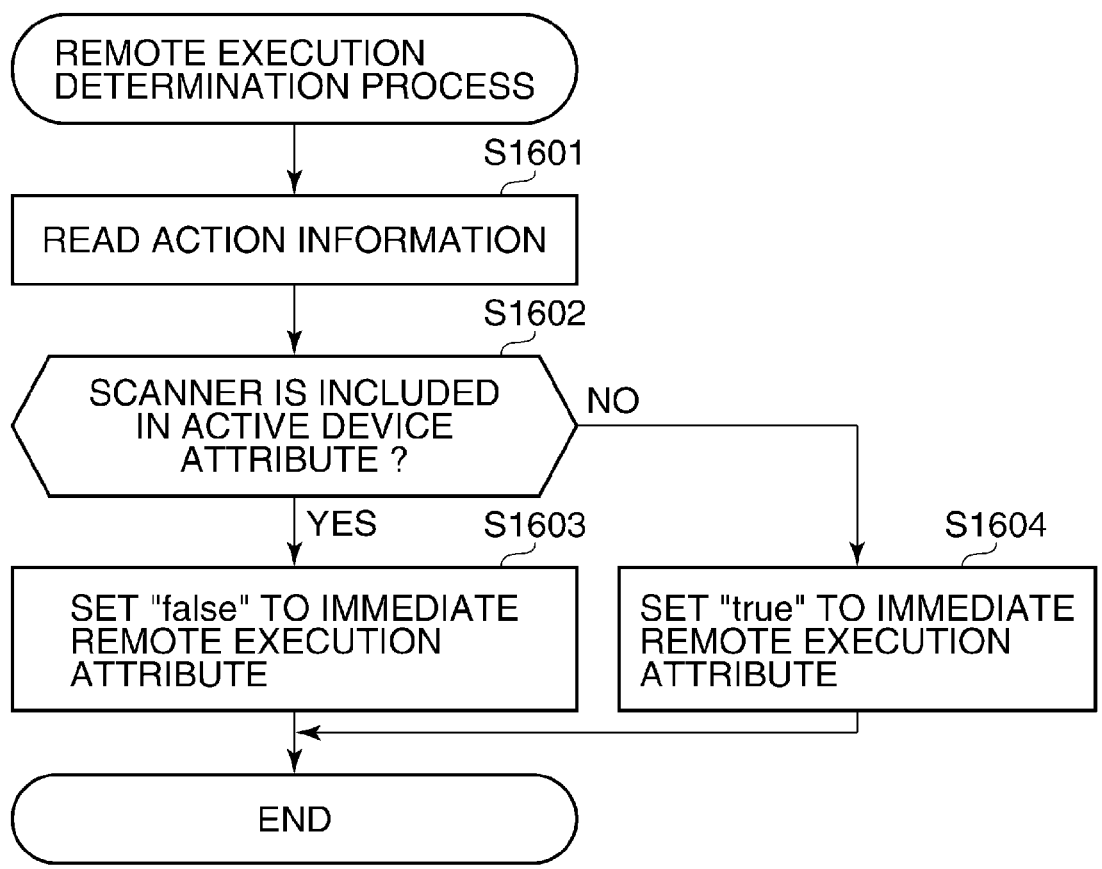
FIG. 13 is a flowchart showing procedures of a remote execution determination process executed in S1507 in FIG. 12B.

FIG. 13 is a flowchart showing procedures of the remote execution determination process executed in S1507 in FIG. 12B.

The portal corresponding application 107 reads the action information from the portal PC application 105 in order to determine whether the portal button can be executed immediately (S1601). When the process by the portal corresponding application 107 includes a process concerning the scanning, the user must work for setting an original to the scanner. Accordingly, the remote execution determination unit 430 of the copy application 401 determines whether the scanner is included in the active device attribute of the action information 420 (S1602).

When the scanner unit 202 is included in the active device attribute 820 as a result of the determination in the step S1602, the remote execution determination unit 430 sets "false" to the immediate remote execution attribute 810 (S1603). When the scanner unit 202 is not included, "true" is set (S1604).

Since the remote execution determination units 430, 432, and 434 are provided for the respective portal corresponding applications, it can be determined whether the immediate remote execution is possible or not for each application.

FIG. 14A and FIG. 14B are flowcharts showing procedures of the process (S1404) for acquiring the setting screen information 440 in FIG. 4.

The portal PC application 105 requests acquisition of the setting screen information 440 from the portal application 106 (S1701). The portal application 106 requests acquisition of the setting screen information 440 corresponding to every application ID from the portal corresponding application 107 (S1702).

The portal corresponding application 107 determines whether the setting screen information 440 is held (S1703). When it is held, the setting screen information 440 is distributed (S1704). The portal application 106 receives the setting screen information 440 (S1705), and distributes all pieces of the received setting screen information 440 to the portal PC application 105. The portal PC application 105 receives the setting screen information 440 of each portal corresponding application 107 (S1707), and finishes the process.

It should be noted that the setting screen information 440 is generated according to the description of the Java (registered trademark) applet, and is displayed as the portal button applet 960 by the portal PC application 105 in this embodiment.

FIG. 15A and FIG. 15B are flowcharts showing procedures of a portal button registration process that starts by a notice of a depression of the button registration button 986 in FIG. 9A.

The portal PC application 105 reads the portal button that is selected by the user into the RAM 302 (S1801). The portal PC application 105 distributes the button information 410 and the action information 420 of the selected portal button to the portal application 106 (S1802).

The portal application 106 receives the button information 410 and the action information 420 distributed from the portal PC application 105 (S1803). The portal application 106 distributes the action information 420 to the portal corresponding application 107 (S1804).

The portal corresponding application 107 receives the action information 420 (S1805), and executes the remote execution determination process mentioned above in FIG. 13 (S1806). The portal corresponding application 107 distributes the application ID and icon information together with the registration request of the portal button to the portal application 106 (S1807).

The portal application 106 issues an action ID and adds the application ID and the action ID to the button information 410 (S1808). The portal corresponding application 107 assigns the issued action ID to the action information 420 (S1809).

After completing the assignment by the portal corresponding application 107, the portal application 106 distributes a registration completion notice of a portal button to the portal PC application 105 (S1810).

The portal PC application 105 checks the completion of registration (S1811), and finishes the portal button registration process started from the portal PC application 105.

Figure 16A:
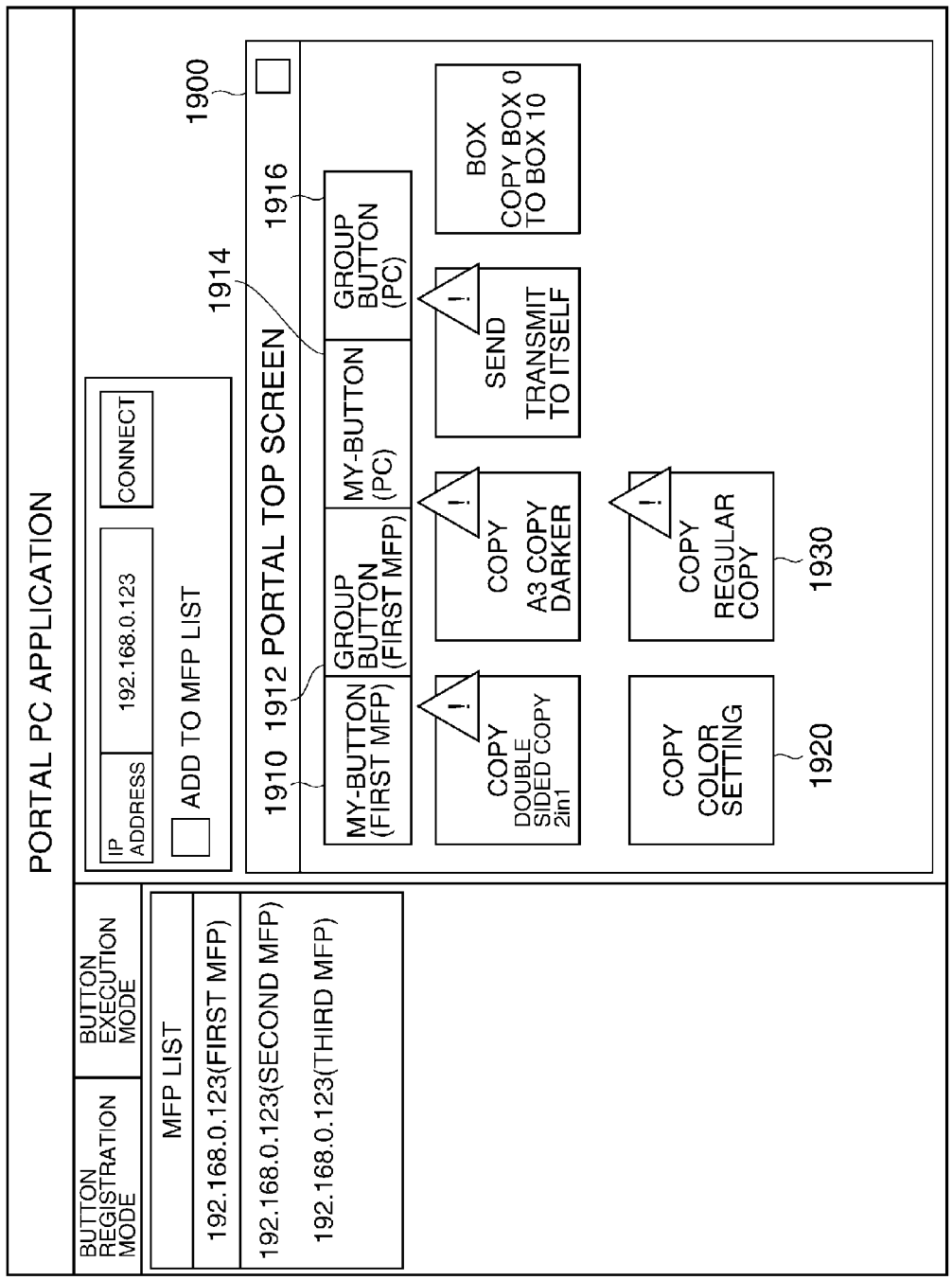
FIG. 16A is a view showing an example of a screen in a button execution mode displayed by the portal PC application in FIG. 1.
Figure 16B:
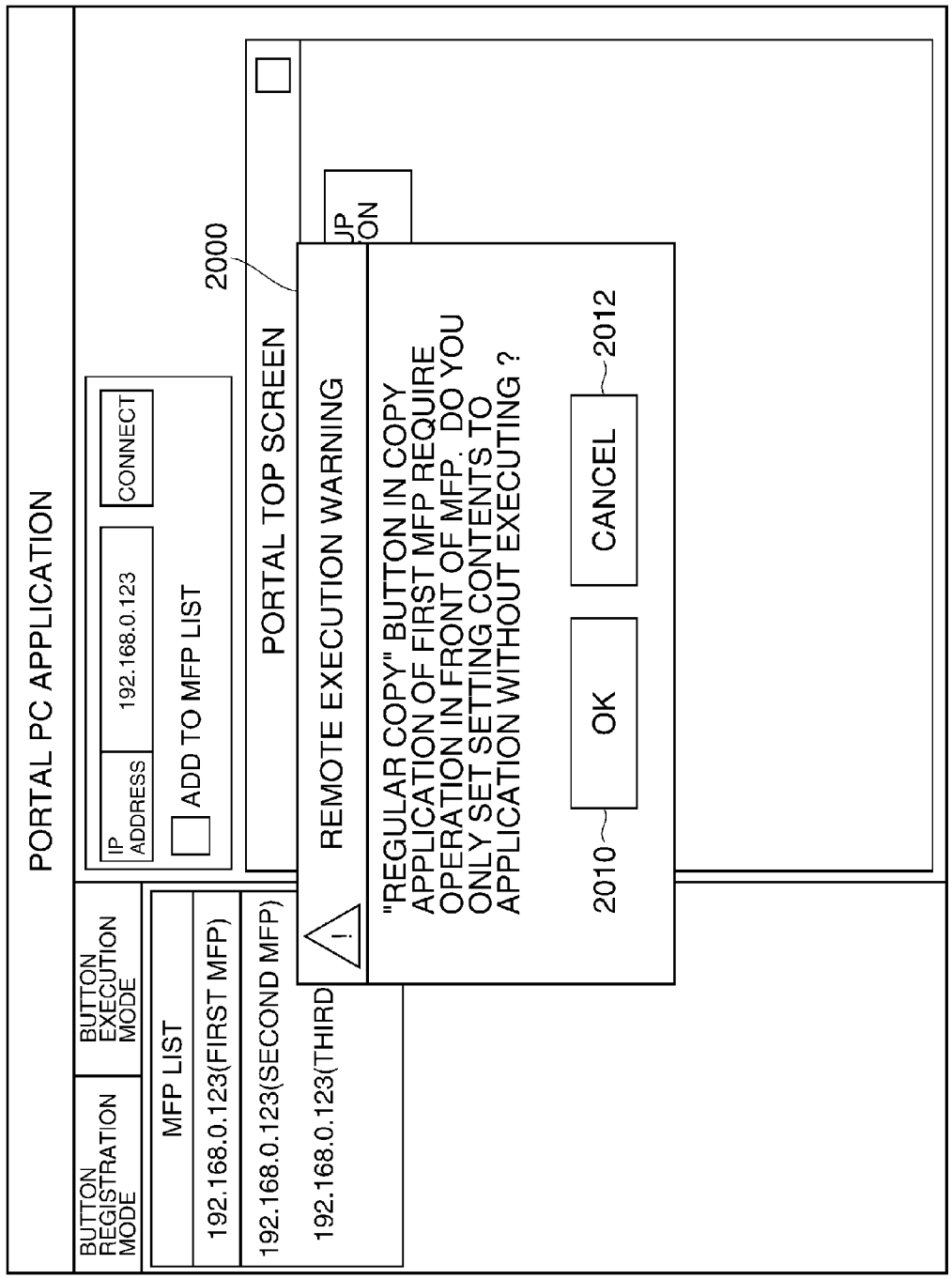
FIG. 16B is a view showing an example of a screen in a case where a portal button related to an action that is impossible to be remotely and immediately executed from the portal PC application in FIG. 1 is depressed.
Figure 17:
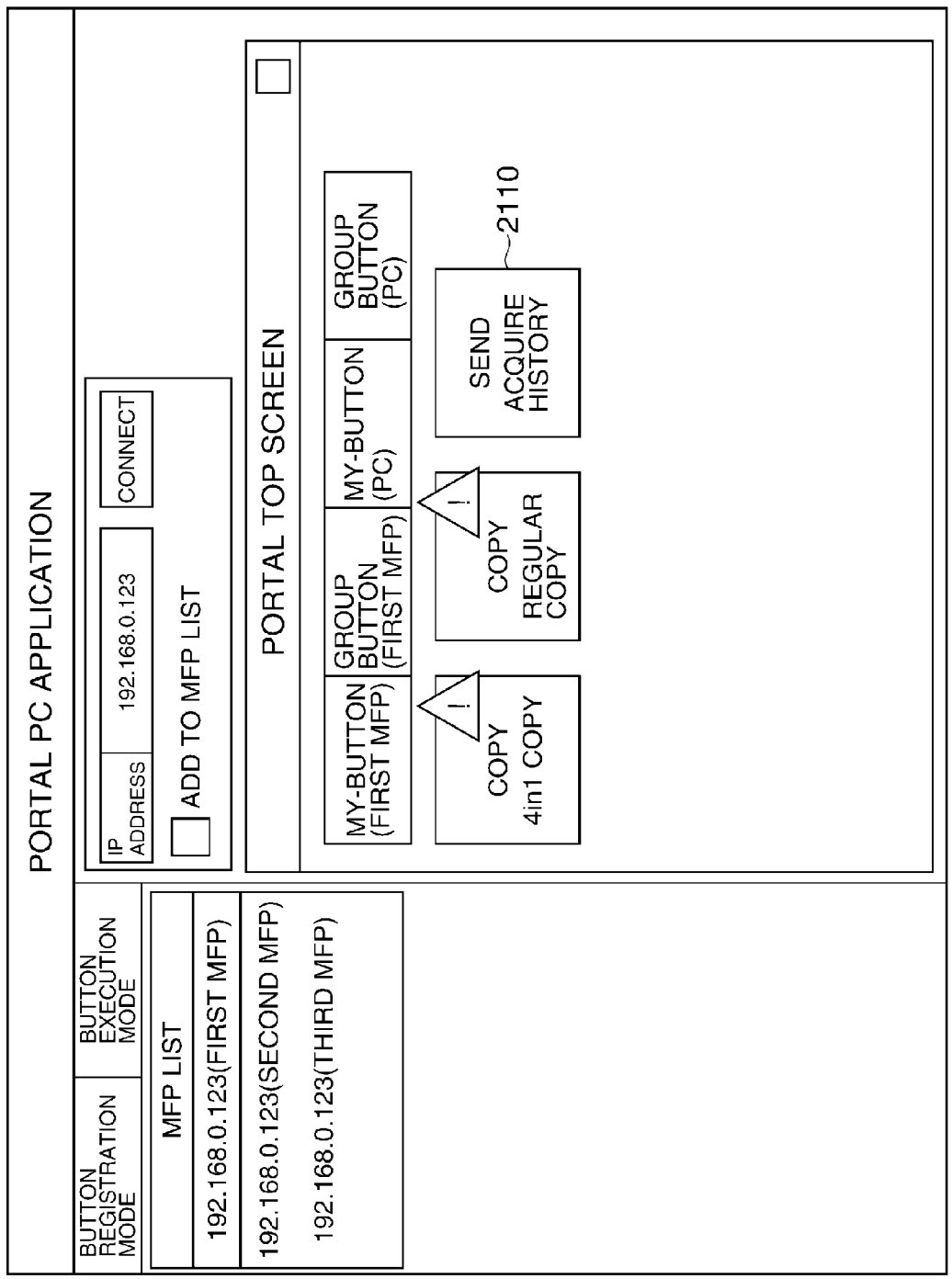
FIG. 17 is a view showing an example of a screen displayed when a my-button (PC) is selected from a group on a portal execution applet of the portal PC application in FIG. 1.

FIG. 16A, FIG. 16B, and FIG. 17 are views showing examples of the UI of the portal PC application 105 in FIG. 1 in the button execution mode.

According to the selection of the button execution mode button 922, the portal PC application 105 connects to the MFP 100 selected in the MFP list 930. When newly connecting to the MFP 100, the same step as button register mode performs.

As shown in FIG. 16A, a portal-button execution applet 1900 displays a my-button 1910 for the first MFP, a group button 1912 for the first MFP, a my-button 1914 for the PC, a group button 1916 for the PC that are corresponding to four selected groups (group classification). When pushing these buttons, the display is changed so that the buttons of the group that is different from the currently displayed group are displayed.

The my-button 1910 and the group button 1912 for the MFP represent the personal portal button and the group portal button stored in the HDD 213 of the MFP, respectively. The my-button 1914 and the group button 1916 for the PC represent the personal portal button portal button and the group portal button stored in the disk 307 of the PC, respectively.

A portal button 1920 represents a button that can be executed from the portal PC application 105. A warning icon is additionally displayed on a portal button 1930. This means that a work in front of the MFP is necessary even if an operation is executed from the portal PC application 105.

When receiving the selection of the portal button 1930 with the warning icon, the portal PC application 105 displays a remote execution warning dialog 2000, as shown in FIG. 16B. When an OK button 2010 is selected, the action information 420 of the portal button 1930 is set to the portal corresponding application 107. When a cancel button 2012 is selected, the execution is stopped.

Since the process represented by the portal button 1920 can be immediately executed from the portal PC application 105, a warning icon is not additionally displayed. When the my-button 1914 for the PC is selected, the screen is changed so as to display a portal button 2110 saved in the PC as shown in FIG. 17.

Figure 18B:
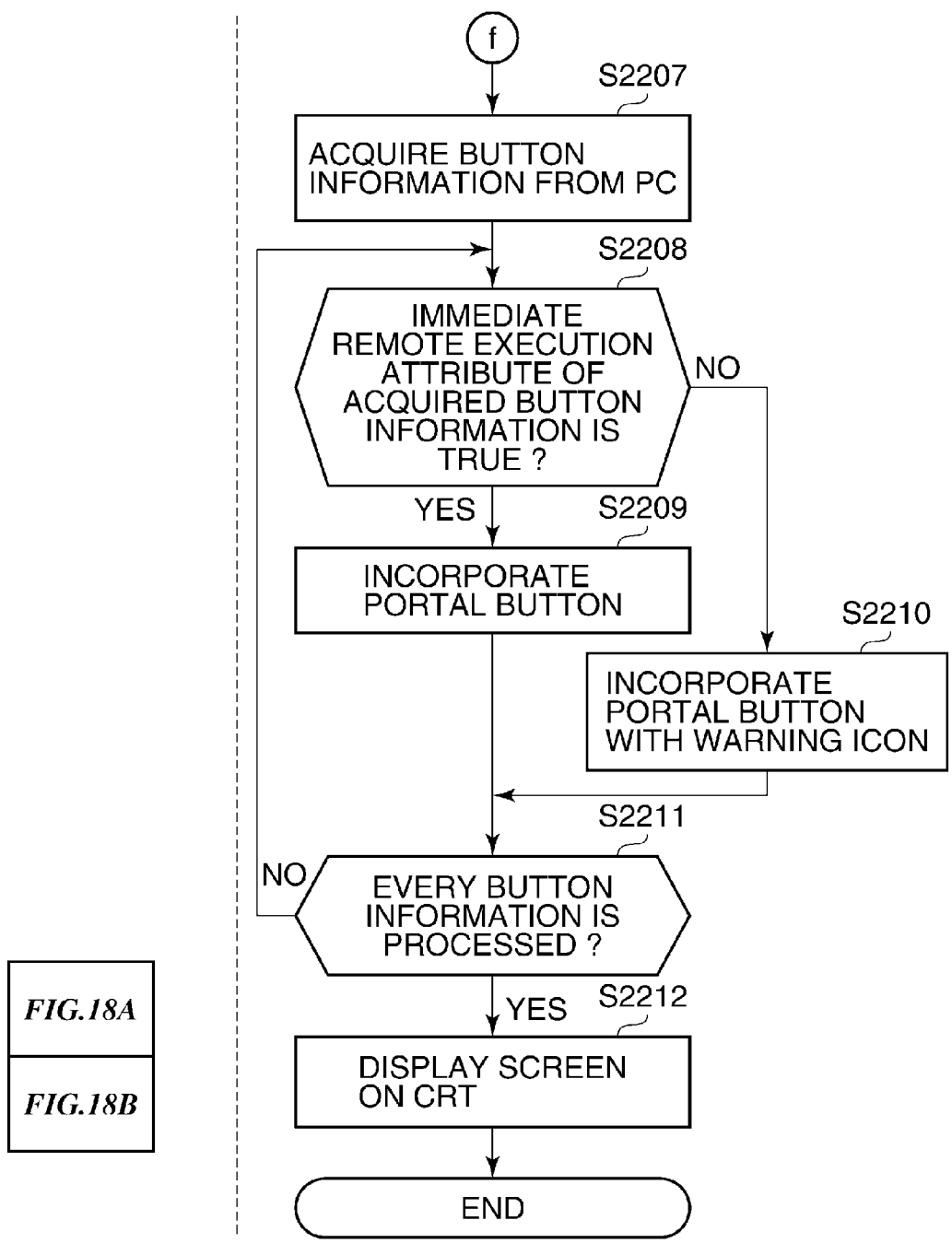

FIG. 18A and FIG. 18B are flowcharts showing procedures of a portal application displaying process (a first embodiment) that starts by an access request to the portal application 106 in FIG. 1.

The access to the portal application 106 is requested by a portal application start notice that is sent by depressing the portal application start button 204 (S2201).

On the other hand, the portal PC application 105 requests to access to the MFP by the connection start signal notified by selecting the connection button 972 (S2202). The portal application 106 determines whether the access is requested by the notice owing to the portal application start button 204 or the notice owing to the portal PC application 105 (S2203).

When the access is requested by the notice owing to the portal application start button 204, the MFP acquires the button information 410 stored in the MFP and displays the information on the operation unit 201 (S2204). When the access is requested by the notice owing to the portal PC application 105, the portal application 106 distributes the stored button information 410 to the portal PC application 105 (S2205).

The portal PC application 105 receives the distributed button information 410 (S2206). The portal PC application 105 acquires the button information 410 saved in the client PC (S2207). Next, the portal PC application determines whether the immediate remote execution attribute 810 of the acquired button information 410 is true or false (S2208).

When the immediate remote execution attribute 810 is true, a portal button is incorporated into the portal button execution applet 1900 in accordance with the button information 410 (S2209). When the immediate remote execution attribute 810 is false, a portal button with a warning icon is incorporated into the portal button execution applet 1900 in accordance with the button information 410 (S2210).

The portal PC application 105 determines whether the above-mentioned process has been executed for every button information acquired (S2211). When the process has not been executed for at least one piece of the button information, the process from S2208 is repeated. When the process has been executed for every button information, the portal PC application 105 displays a screen on the CRT 303 (S2212).

Figure 19A:
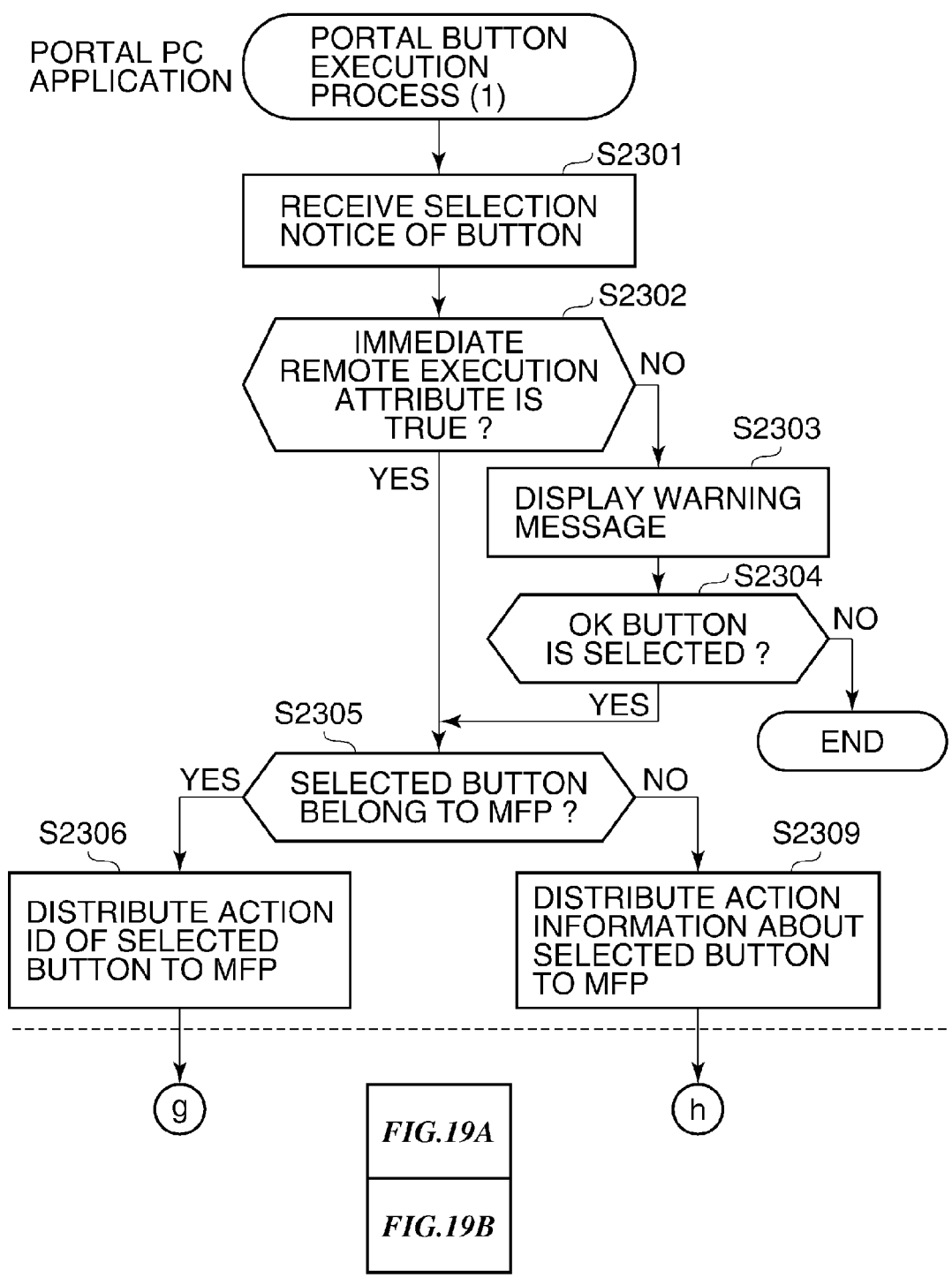

FIG. 19A and FIG. 14B are flowcharts showing procedures of a portal button execution process (the first embodiment) that starts by a portal button selection from the portal PC application 105 in FIG. 1.

The portal PC application 105 receives a selection notice of the portal button (S2301). Next, the portal PC application determines whether the immediate remote execution attribute 810 of the selected button information 410 is true or false (S2302). When the immediate remote execution attribute 810 is true, the process proceeds to S2305. When it is false, the process proceeds to S2303.

In the step S2303, the portal PC application 105 displays a warning message, and determines whether an OK button is selected (S2304). When the portal PC application 105 receives the selection notice of the OK button, the process proceeds to S2305. When receiving the selection notice of a cancel button, the process is finished.

Then, the portal PC application 105 determines whether the group attribute 605 represents the button (the personal button or the group button) of the MFP or the button of the PC (S2305). When the selected button belongs to the MFP, the process proceeds to S2306. When the selected button belongs to the PC, the process controller is changed to the portal application 106 from the portal PC application 105.

When executing an action related with the portal button of the MFP, the portal application 106 requires executing the action corresponding to the action ID (S2307). The portal corresponding application 107 sets the action information corresponding to the required action ID to the field corresponding to the portal corresponding application 107 (S2308).

When executing an action related with the portal button of the PC, the portal application 106 distributes the action information about the PC to the portal corresponding application 107 (S2310). The portal PC application 107 receives the distributed action information 420 (S2311).

The portal corresponding application 107 sets the received action information 420 to the corresponding field of the portal corresponding application 107 (S2308). The portal corresponding application 107 determines whether the immediate remote execution attribute 810 is true or false (S2313).

When the immediate remote execution attribute 810 is true, the portal corresponding application 107 starts to execute the action according to the set action information (S2314). When the immediate remote execution attribute 810 is false, the portal corresponding application 107 displays a screen to which the action information 420 is set on the operation unit 201 (S2315).

Thus, since the portal button is generated from the portal PC application 105 and can be registered in not only the MFP but also the PC, the HDD usage of the MFP can be saved. Since a portal button can be executed even if the user does not go in front of the MFP, and the user is warned at the time of execution about a portal button including a setting that requires a work in front of the MFP, which increases convenience.

According to the first embodiment mentioned above, when executing an action related with the portal button from the portal PC application 105, the action is limited only to the setting of the action information with respect to the portal button of which the immediate remote execution attribute 810 is false.

At this time, when the action related with the group button that is stored in the PC is executed, for example, if another user operates the MFP in front thereof before the user who executes the action goes to the MFP, the setting of the application may be changed.

A second embodiment described below shows an example where an action that is related with a portal button of which the immediate remote execution attribute 810 is false is executed without rewriting setting.

FIG. 6B is a view showing a second example of data of the button information 410 in FIG. 4 in the XML format.

The difference from FIG. 6A that is shown in the first embodiment is a point where the group attribute value 610 becomes temporary 2401. The temporary 2401 shows that the button is eliminated after execution with the notice of the depression of the button.

Figure 20A:
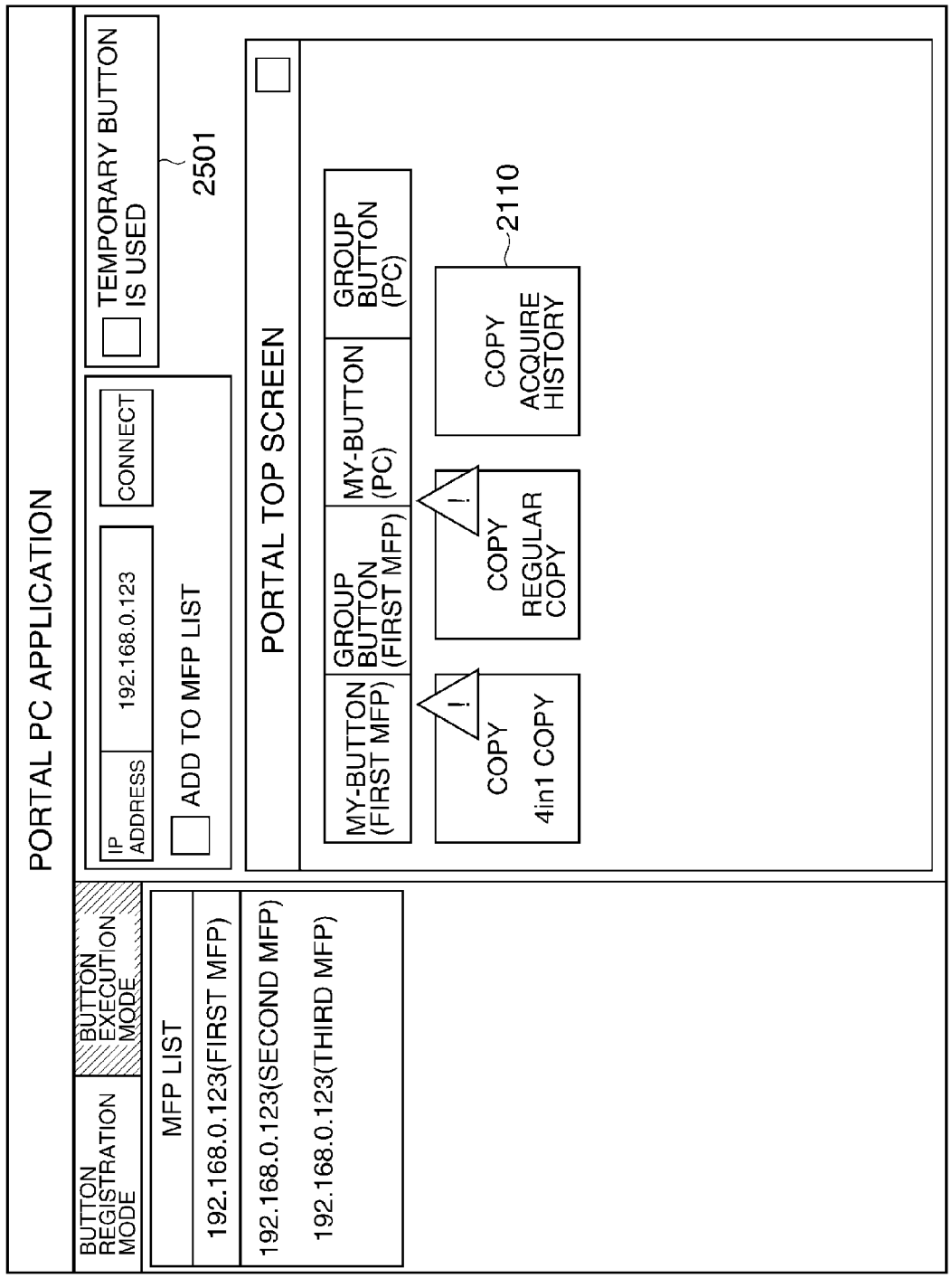
FIG. 20A is a view showing an example of a setting item of a temporary button in the button execution mode of the portal PC application in FIG. 1.
Figure 20B:
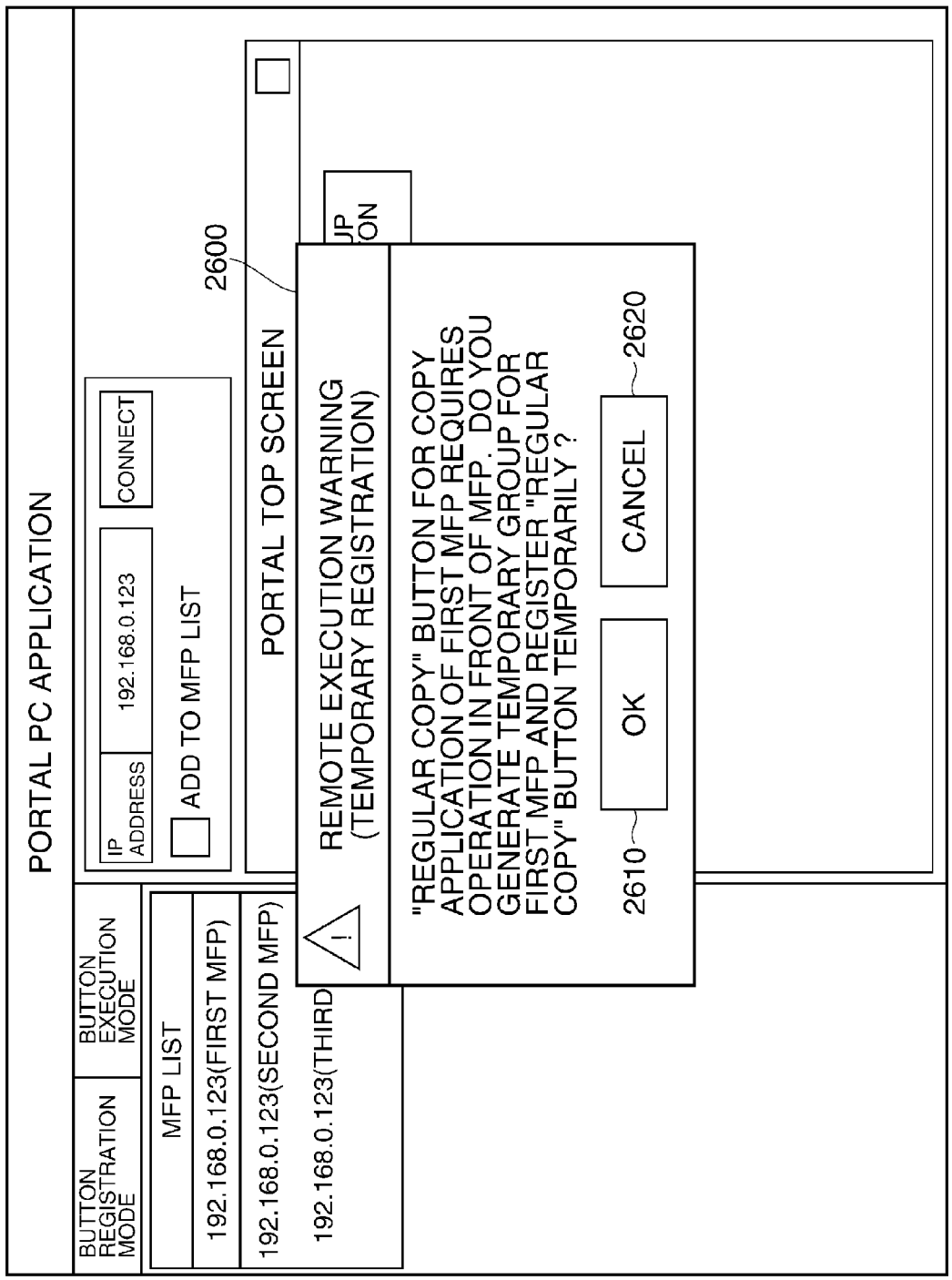
FIG. 20B is a view showing an example of a screen in a case where a portal button related to an action that is impossible to be remotely and immediately executed from the portal PC application in FIG. 1 is depressed when the temporary button is effective.

FIG. 20A is a view showing an example of a setting item of a temporary button in the button execution mode of the portal PC application 105 in FIG. 1. The difference from FIG. 17 is a point where a check box for using a temporary button 2501 is added to the setting item. FIG. 20B is a view showing an example of a screen when an action related to a portal button that is impossible to be remotely and immediately executed from the portal PC application in FIG. 1 is executed when the temporary button is effective.

When the check box for using the temporary button 2501 is checked, if an action related to a portal button of which the immediate remote execution attribute 810 is false is executed, the portal PC application 105 displays a remote execution warning (temporary registration) dialog 2600, as shown in FIG. 20B.

In the remote execution warning (temporary registration) dialog 2600, when an OK button 2610 is selected, the group attribute value 610 is made temporary and the portal button is registered to the portal application 105 as a temporary button. When a cancel button 2620 is selected, the process is stopped.

Figure 21A:
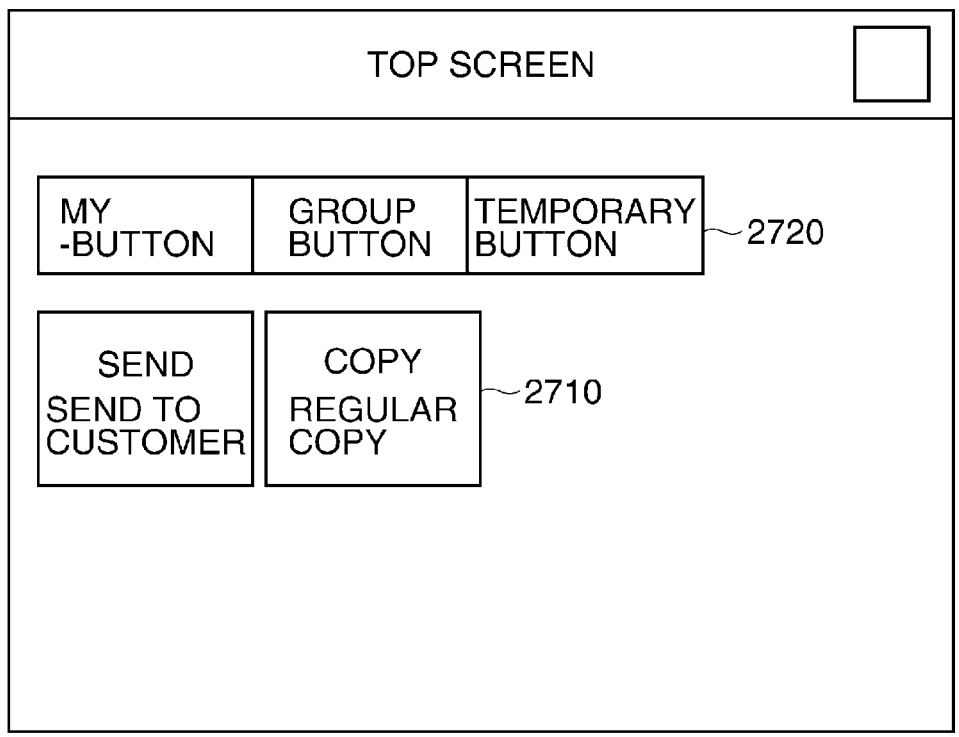
FIG. 21A is a view showing an example of a top screen with the temporary button displayed by the portal application in FIG. 1.

FIG. 21A is a view showing a top screen of the portal application 106 displayed on the operation unit 201, when a portal button 2710 is registered in the portal application 106 in FIG. 1.

Figure 21B:
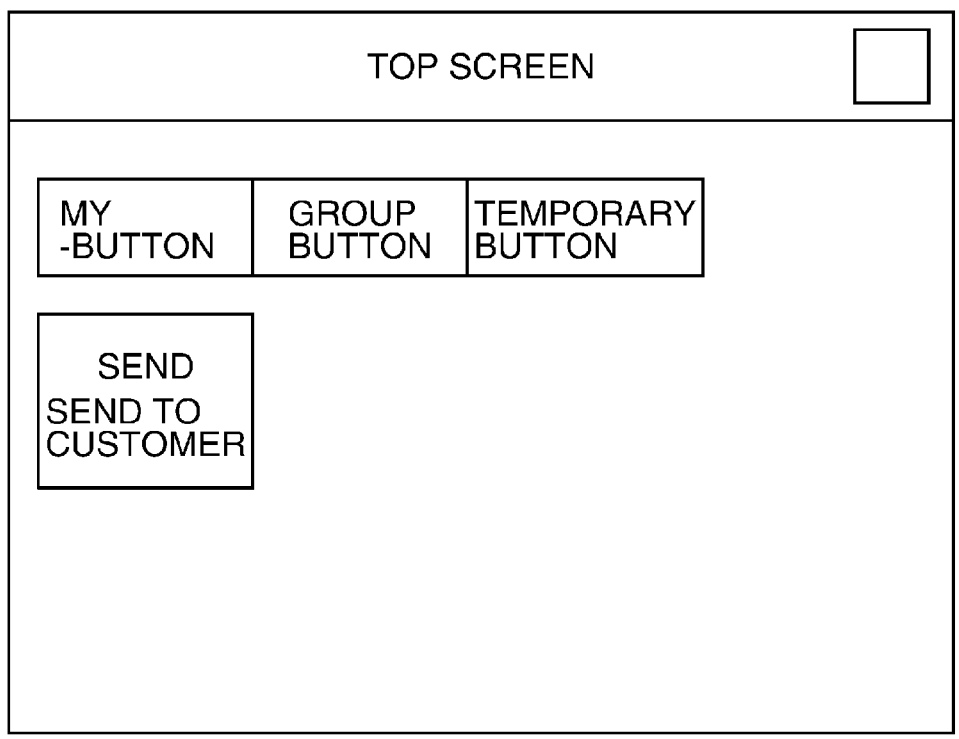
FIG. 21B is a view showing an example of the top screen displayed after executing an action related with the temporary button from the portal application in FIG. 1.

When the portal button 2710 is registered in the portal application 106, a temporary button group 2720 is displayed. And when the operation unit 201 detects a selection of the portal button 2710, the portal application 106 starts to execute according to the setting item. And the executed portal button 2710 is deleted by a portal button deletion process of the portal application 106, and as shown in FIG. 21B, the deleted button is no longer displayed on the operation unit 201.

Figure 22B:
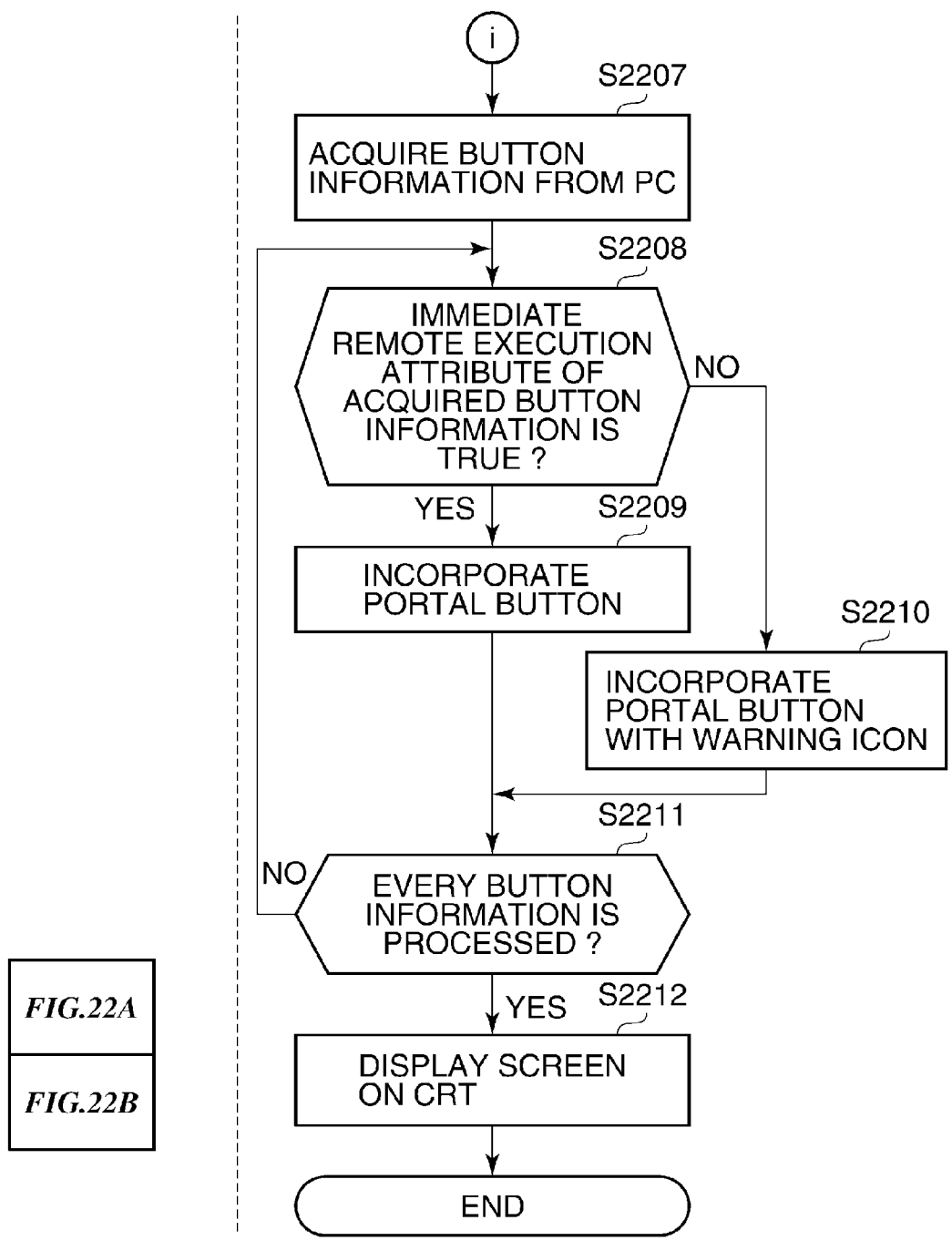

FIG. 22A and FIG. 22B are flowcharts showing procedures of a portal application displaying process (a second embodiment) that starts by an access request to the portal application 106 in FIG. 1.

It should be noted that the parts common with that in the flowcharts (FIG. 18A and FIG. 18B) shown in the above-mentioned first embodiment are labeled by the same reference numbers in FIG. 22A and FIG. 22B.

The difference from FIG. 18A and FIG. 18B is a point where the MFP acquires the button information 410 that is stored in itself (S2901) and determines whether there is the button information about which the group attribute value 610 is temporary among the acquired button information 410 (S2902).

When the group attribute value 610 is temporary, the portal button is added to the temporary group (S2903), otherwise, the process proceeds to S2904. Finally all the portal buttons are classified according to group, and are displayed on the portal top screen (S2904).

Figure 23A:
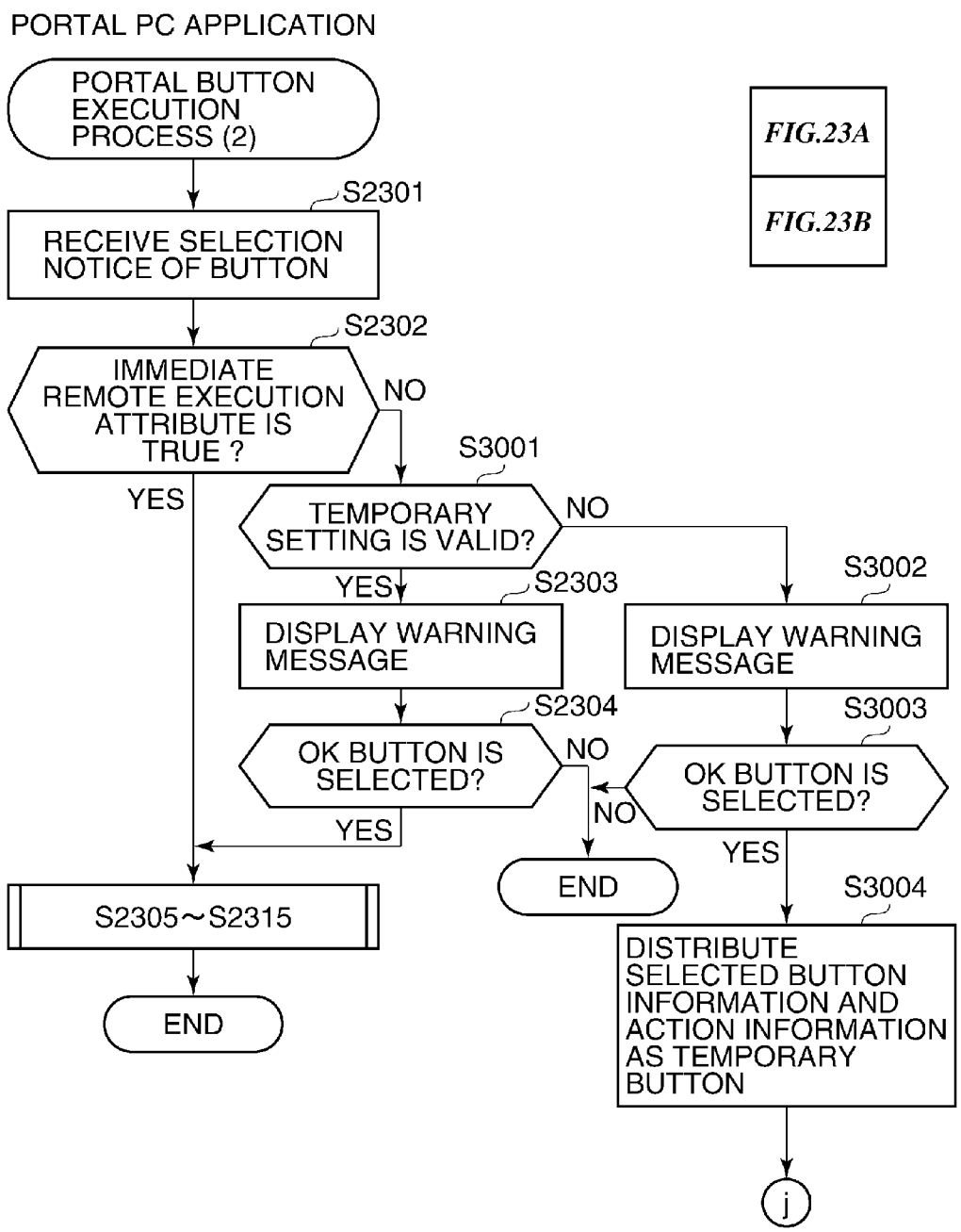

FIG. 23A and FIG. 23B are flowcharts showing procedures of a portal application execution process (the second embodiment) that starts by a portal button selection from the portal PC application 105 in FIG. 1.

It should be noted that the parts common with that in the flowcharts (FIG. 19A and FIG. 19B) shown in the above-mentioned first embodiment are labeled by the same reference numbers in FIG. 23A and FIG. 23B.

The difference from FIG. 19A and FIG. 19B is a point where the portal PC application 105 determines whether the temporary setting is valid or invalid (S3001). If valid, a warning message is displayed (S3002) and the selection notice of the OK button is confirmed (S3003).

Here, the portal PC application 105 interrupts the process when the notice of the cancel button 2620 is received. When the notice of the OK button 2610 is received, the portal PC application 105 distributes the selected button information 410 and the action information 420 as a temporary button (S3004).

The portal application 106 receives the button information 410 and the action information 420 distributed from the portal PC application (S3005). The portal application 106 distributes the action information received to the portal corresponding application 107 (S3006).

Receiving the action information (S3007), the portal corresponding application 107 distributes the application ID and icon information together with the registration request of the portal button to the portal application 106 (S3008).

The portal application 106 creates a portal button and an action ID (S3009). The portal corresponding application 107 assigns the created action ID to the setting information (S3010). The process from S3004 to S3010 functions as a temporality button generation unit.

The above-mentioned procedure is needed to register the temporary button to the MFP when the action related with the portal button of the PC is executed from the portal PC application 105.

Figure 24A:
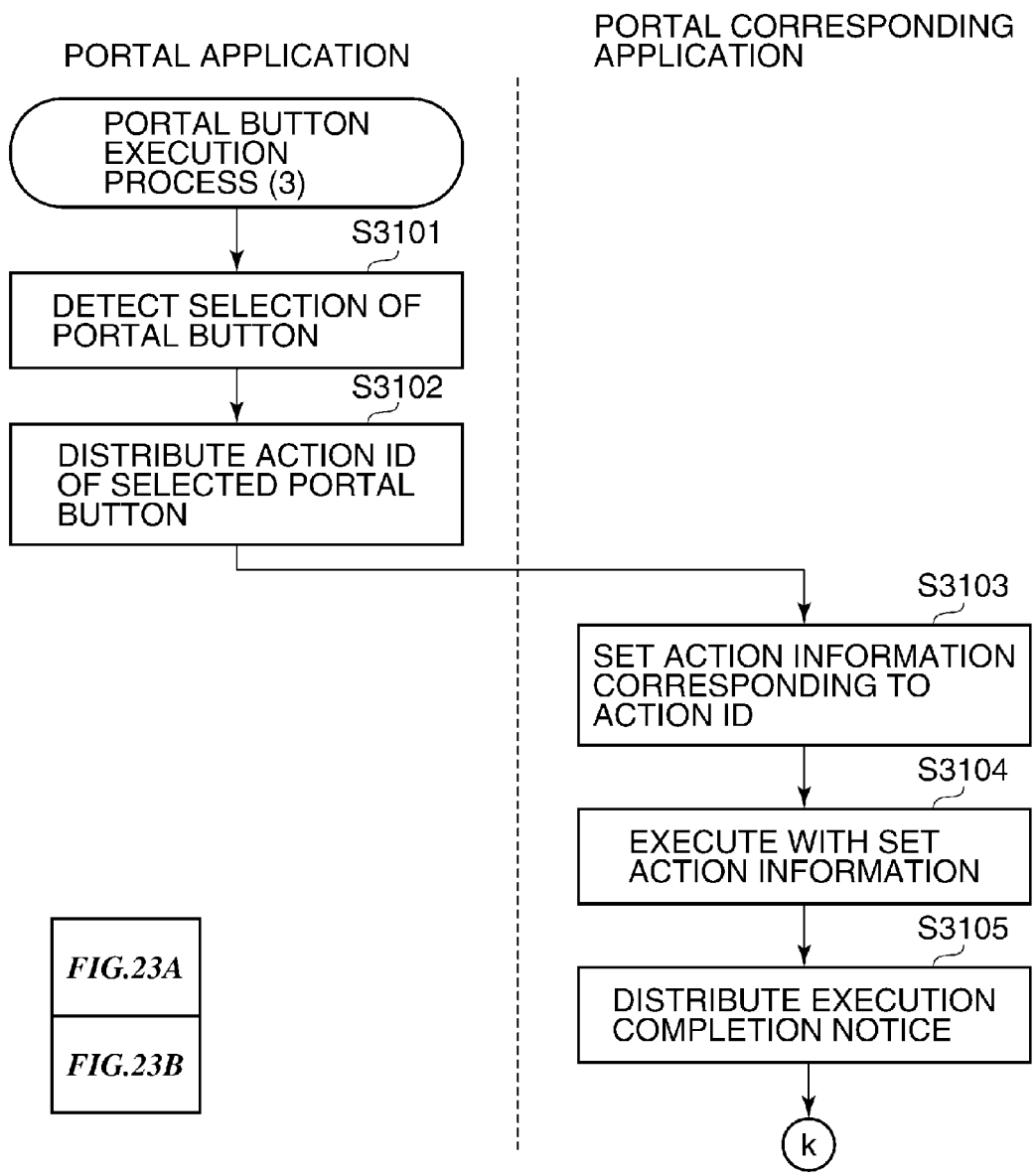

FIG. 24A and FIG. 24B are flowcharts showing procedures of the portal button execution process from the portal application 106 in the FIG. 1 in consideration of the temporary button registered into the MFP.

The portal application 106 receives the selection notice of the portal button from the operation unit 201 (S3101), and distributes the action ID of the selected portal button to the portal corresponding application 107 (S3102).

The portal corresponding application 107 sets the action information 420 corresponding to the action ID (S3103), and executes the action related with the portal button according to the set action information (S3104). The portal corresponding application 107 distributes an execution completion notice to the portal application 106 (S3105).

the portal application 106 determines whether the group attribute value 610 of the selected portal button is temporary (S3106). If not temporary, the process is finished. If temporary, the portal application 106 requests a deletion of the action information 420 corresponding to the selected action ID from the portal corresponding application 107 (S3107).

The portal corresponding application 107 deletes the action information corresponding to the action ID (S3108), and distributes a deletion completion notice to the portal application 106 (S3109). The portal application 106 deletes the button information 410 corresponding to the selected action ID (S3110). The above is the portal button executive process in consideration of the temporary button from the portal application. The process from S3107 to S3110 functions as a button deletion unit.

Thus, in the second embodiment, when executing the action related with the portal button that only the PC has from the portal PC application 105, the button that needs to operate at the MFP is registered as the temporary button. Accordingly, since a possibility that the setting is rewritten by another user is reduced, the user's convenience increases.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-195297, filed on Aug. 26, 2009, which is hereby incorporated by reference herein in its entirety.

What is claimed is:

1. An image processing apparatus communicable with an information processing apparatus so as to allow communication, the image processing apparatus comprising:
   a storage unit configured to store setting information for executing a function with which the image processing apparatus is provided;
   an execution unit configured to execute the function according to the setting information stored in said storage unit;
   a determination unit configured to determine whether a user's operation to the image processing apparatus is required when said execution unit executes the function according to the setting information stored in said storage unit;
   an addition unit configured to add attribute information, which shows whether to permit to automatically execute the function according to the setting information based on an instruction from the information processing apparatus, to the setting information according to a determination result by said determination unit; and
   a sending unit configured to send the setting information to which said additional unit has added the attribute information to the information processing apparatus.

2. The image processing apparatus according to claim 1, wherein said determination unit determines that a user's operation to the image processing apparatus is required to execute the function according to the setting information when the setting information includes information showing a use of a scanner with which the image processing apparatus is provided.

3. The information processing apparatus according to claim 1, further comprising:
   a receiving unit configured to receive a request to execute a function that is set according to the setting information with the setting information from the information processing apparatus; and
   an operation unit configured to accept an instruction by a user,
   wherein said execution unit waits for executing the function according to the setting information until the instruction from the user is received, and executes the function when the instruction to execute the function is received from the user through said operation unit during waiting when the attribute information added to the setting information received by said receiving unit means to restrict an automatic execution of the function according to the setting information based on an instruction from the information processing apparatus.

4. A control method for an image processing apparatus communicable with an information processing apparatus so as to allow communication, the method comprising:
   an execution step of executing a function according to setting information stored in a storage unit for executing the function with which the image processing apparatus is provided;
   a determination step of determining whether a users operation to the image processing apparatus is required when executing the function in said execution step according to the setting information stored in the storage unit;
   an addition step of adding attribute information, which shows whether to permit to automatically execute the function according to the setting information based on an instruction from the information processing apparatus, to the setting information according to a determination result in said determination step; and
   a sending step of sending the setting information to which the attribute information has added in said addition step to the information processing apparatus.

5. The control method for the image processing apparatus according to claim 4, wherein said determination step determines that a user's operation to the image processing apparatus is required to execute the function according to the setting information when the setting information includes information showing a use of a scanner with which the image processing apparatus is provided.

6. The control method for the information processing apparatus according to claim 4, further comprising:
   a receiving step of receiving a request to execute a function that is set according to the setting information with the setting information from the information processing apparatus; and
   an acceptance step of accepting an instruction by a user,
   wherein the execution of the function according to the setting information is waited until the instruction from the user is accepted in said acceptance step, and the function is executed when the instruction to execute the function is accepted from the user in said acceptance step during waiting when the attribute information added to the setting information to restrict an automatic execution of the function according to the setting information based on an instruction from the information processing apparatus.

7. An image processing apparatus communicable with an information processing apparatus so as to allow communication, the image processing apparatus comprising:
   a storage device that stores setting information for executing a function provided by the image processing apparatus;
   a processor configured to execute:
   a determination task of determining whether a users operation to the image processing apparatus is required when the image processing apparatus executes the function according to the setting information stored in said storage device;
   an adding task of adding attribute information, which shows whether to permit automatic execution of the function according to the setting information based on an instruction from the information processing apparatus, to the setting information according to the determination made by the determination task; and
   a sending task of sending the setting information to which the attribute information has added to the information processing apparatus by the adding task.

* * * * *